United States Patent
Bhatt et al.

(10) Patent No.: US 8,617,736 B2
(45) Date of Patent: Dec. 31, 2013

(54) REDOX ELECTRODES FOR FLEXIBLE DEVICES

(75) Inventors: Anand Indravadan Bhatt, Clayton (AU); Graeme Andrew Snook, Clayton (AU); Adam Samuel Best, Ferntree Gully (AU); Richard James Neil Helmer, Geelong West (AU); Pamela Margaret Petersen, Highton (AU)

(73) Assignee: Commonwealth Scientific and Industrial Research Organisation, Campbell, Australian Capital Territory (AU)

( * ) Notice: Subject to any disclaimer, the term of this patent is extended or adjusted under 35 U.S.C. 154(b) by 233 days.

(21) Appl. No.: 12/988,352

(22) PCT Filed: Apr. 17, 2009

(86) PCT No.: PCT/AU2009/000474
§ 371 (c)(1),
(2), (4) Date: Jan. 6, 2011

(87) PCT Pub. No.: WO2009/127006
PCT Pub. Date: Oct. 22, 2009

(65) Prior Publication Data
US 2011/0097624 A1    Apr. 28, 2011

(30) Foreign Application Priority Data
Apr. 17, 2008  (AU) .................... 2008901908

(51) Int. Cl.
*H01M 6/00* (2006.01)
*H01M 4/13* (2010.01)

(52) U.S. Cl.
USPC ............... 429/127; 429/212; 429/213

(58) Field of Classification Search
None
See application file for complete search history.

(56) References Cited

U.S. PATENT DOCUMENTS

| | | | |
|---|---|---|---|
| 7,301,435 B2 | 11/2007 | Lussey et al. | |
| 7,586,665 B1 * | 9/2009 | Martin | 359/265 |
| 2006/0275660 A1 | 12/2006 | Zama et al. | |

FOREIGN PATENT DOCUMENTS

| | | |
|---|---|---|
| CA | 2 280 999 | 2/2000 |
| DE | 3 821 519 | 12/1989 |
| GB | 2 424 121 | 9/2006 |
| WO | WO 96/39707 | 12/1996 |
| WO | WO 2007/059589 | 5/2007 |
| WO | WO 2007/118281 | 10/2007 |

OTHER PUBLICATIONS

De Paoli et. al., All polymeric solid state electrochromic devices, Electrochimica Acta, 44, (1999), 2983-2991.*
International Search Report for PCT/AU2009/000474, mailed Jul. 7, 2009.

* cited by examiner

*Primary Examiner* — Cynthia K. Walls
(74) *Attorney, Agent, or Firm* — Nixon & Vanderhye P.C.

(57) ABSTRACT

Flexible electrodes comprising: a fabric substrate; a conductive polymer, copolymer or mixture of conductive polymers comprising a first component which has high specific electrochemical capacitance, and a second component which has a lower electrochemical capacitance, lower molecular density, and greater electrical conductivity compared to the first component; and a counterion stable to lithium are described. The first component may be a polymer such as polyaniline or polypyrrole, and second component may be a polymer such as polythiophene or polyEDOT. Copolymers, and polymers formed from co-monomer of these monomer units are also described. The electrodes are used in flexible devices such as flexible energy storage devices.

10 Claims, 12 Drawing Sheets

REDOX ELECTRODES FOR FLEXIBLE DEVICES

This application is the U.S. national phase of International Application No. PCT/AU2009/000474 filed 17 Apr. 2009 which designated the U.S. and claims priority to AU 2008901908 filed 17 Apr. 2008, the entire contents of each of which are hereby incorporated by reference.

FIELD OF THE INVENTION

The present invention relates to redox electrodes for flexible devices such as flexible energy storage devices, devices and articles comprising the electrode, and methods for forming the electrode.

BACKGROUND

Energy storage devices are devices such as batteries, capacitors, hybrid or asymmetric batteries and so forth which store and supply electrical energy or a current. Energy storage devices comprise electrodes (a cathode and an anode) and an electrolyte, all housed within a housing. Other devices including electrodes are sensors in electronic and medical monitoring devices.

There are many types of energy storage devices available commercially, and energy storage devices come in different sizes and arrangements appropriate for particular applications. Most commonly, energy storage devices such as batteries for portable applications include a hard casing, typically formed from a metal, which contributes considerable weight and bulk to the device. Many such devices are cylindrical in configuration, and thus do not utilise space most efficiently for applications where space, weight and bulk are of major importance.

One application where space and weight is important is in the area of the inclusion of energy storage devices or sensors in garments, or in other objects that are worn or carried by humans. In the case of military applications, military personnel are required to have a source of electrical energy to operate equipment. In such applications, military personnel may be carrying the equipment and energy storage device for many days, and thus comfort, weight, bulk and safety are of critical importance. Other applications where these considerations are of importance are in the area of operating portable electronic devices, such as entertainment devices including MP3 players and radios, communication devices including mobile phones and radios, and medical monitoring devices including sensors.

It has been recognised by the applicant that a flexible energy storage device, which can be incorporated into a flexible article such as a garment, could provide many benefits in these applications compared to rigid energy storage devices. However, for such devices to be a possibility, the flexibility must not compromise the performance of the storage device. Moreover, the components of such devices such as the cathode need to enable a balance to be achieved between flexibility, mechanical stability, good cycling properties (such as a rapid charge and discharge) and a sufficiently high energy density.

SUMMARY

According to the present invention there is provided a flexible electrode comprising:
  fabric substrate;
  a conductive polymer, copolymer or mixture of conductive polymers comprising a first component which has high specific electrochemical capacitance, and a second component which has a lower electrochemical capacitance, lower molecular density, and greater electrical conductivity compared to the first component; and
  a counterion stable to lithium.

The conductive polymer, copolymer or mixture is a composite of two (or more) components, one of which provides high electrochemical capacitance, and the second of which provides better porosity (molecular density) and conductivity, so that the composite obtains the benefit of all of these properties.

There are three main forms of the composite of the first and second components.

In a first form, the first and second components are each conductive polymers which are co-deposited onto the fabric substrate from a mixture of monomers which form the two polymers in solution. This co-deposition technique results in a random deposition of the polymers throughout the mixed conductive polymer layer on the fabric substrate, rather than a regular layered structure.

In a second form, the first and second components are each conductive polymers which form layers of the first and second conductive polymers on the fabric substrate. This produces a regular layered arrangement, as distinct from the random arrangement of the first form. The flexible energy storage device thus comprises at least one layer of each of a first conductive polymer and a second conductive polymer on the fabric substrate. The layers alternate between the first and second conductive polymers.

In a third form, the first and second components comprise segments of a single polymer or copolymer. In this embodiment, the components are covalently connected, optionally with other chemical groups. The first and second components therefore form part of a "co-monomer", which is polymerised to form a conductive polymer comprising the first and second components. Examples of co-monomers are illustrated below.

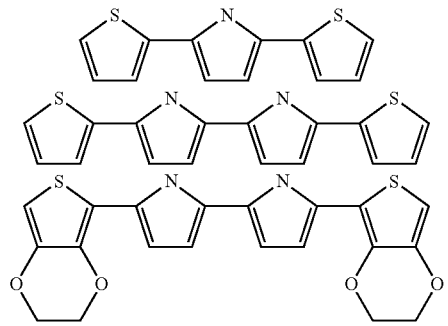

If the first and second components are each conductive polymers, the flexible electrode comprises:
  a fabric substrate;
  a first conductive polymer of high specific electrochemical capacitance;
  a second conductive polymer of lower electrochemical capacitance, lower molecular density and greater electrical conductivity component to the first component; and
  a counterion stable to lithium.

According to the present invention there is also provided a flexible energy storage device comprising:
  flexible housing;
  a flexible cathode comprising:
    fabric substrate; and
    a conductive polymer, copolymer or mixture of conductive polymers comprising a first component which has high specific electrochemical capacity, and a second component which has a lower electrochemical capacity, lower molecular density, and greater electrical conductivity compared to the first component; and
a counterion stable to lithium;
a flexible anode; and
an electrolyte.

The electrolyte may be any electrolyte known in the art, but according to one embodiment, the electrolyte is an ionic liquid.

The anode material may be of any type known in the art. According to one embodiment, the anode material is lithium metal, such that the energy storage device is a lithium metal energy storage device, such as a lithium metal battery. Other noted anodes including capacitor anodes such as double-layer capacitor anodes or pseudocapacitor anodes including conductive polymer anodes.

Depending on the nature of the electrolyte material, the device may further comprise a separator positioned between the cathode and the anode. The separator may be of any appropriate type known in the art, and according to one embodiment is a fabric or fibrous membrane separator. For polymer electrolytes, a separator may not be required.

According to the present invention there is also provided an article comprising the flexible electrode or flexible energy storage device as described above. Such articles include garments, jackets, medical articles such as monitoring devices for medical applications or otherwise, bandages and wound dressings, military equipment, portable electronic devices, mobile (cell) phones, radios, sensors, sporting devices and so forth. In the case of garments, the flexible energy storage device, incorporating fabric substrate-based electrodes, or the flexible electrode should not adversely affect the textile properties of the host garment, compared to the host garment in the absence of the flexible energy storage device. Properties of the host garment that should be retained are thermal properties, mechanical properties of the fabric of the host garment, moisture management and ergonomics, so it does not subtract from the flexibility and functionality of the garment, barrier and airflow properties. This may be achieved by appropriate placement of the flexible energy storage device, but alternatively or additionally by design features of the flexible energy storage device.

According to the present invention there is also provided a method for forming a flexible electrode comprising:
chemically or electrochemically depositing a conductive polymer, copolymer, or a mixture of conductive polymers, onto a fabric substrate, and
providing a counterion for the conductive polymer, copolymer or polymer mixture which is stable to lithium.

Preferably, the depositing step comprises depositing the polymer, copolymer or mixture of conductive polymers from a solution of a monomer or mixture of monomers. This can be completed in a single stage or in multiple stages, multiple stages being suitable for layered formations.

Further, it has been found that a number of benefits are obtained from depositing the conductive polymer, copolymer or mixture of polymers from an ionic liquid.

Accordingly to another embodiment, the method comprises chemically depositing and oxidising the conductive polymer, copolymer or mixture of polymers onto the fabric substrate. Again, it is preferred that the polymer, copolymer or mixture of the polymers be deposited from an ionic liquid containing the monomer or mixture of monomers.

According to one embodiment, the anion component of the oxidant is the same as the anion of the electrolyte for the flexible energy storage device. This enables the flexible cathode to be used or inserted into an energy storage device without subjecting the cathode to ion exchange. Suitable oxidants of this type include hydrogen bis (trifluoromethanesulfonyl)imide-HTFSI or hydrogen bis(fluorosulfonyl)imide-HFSI.

DETAILED DESCRIPTION

Flexible Electrodes

Figure 1:
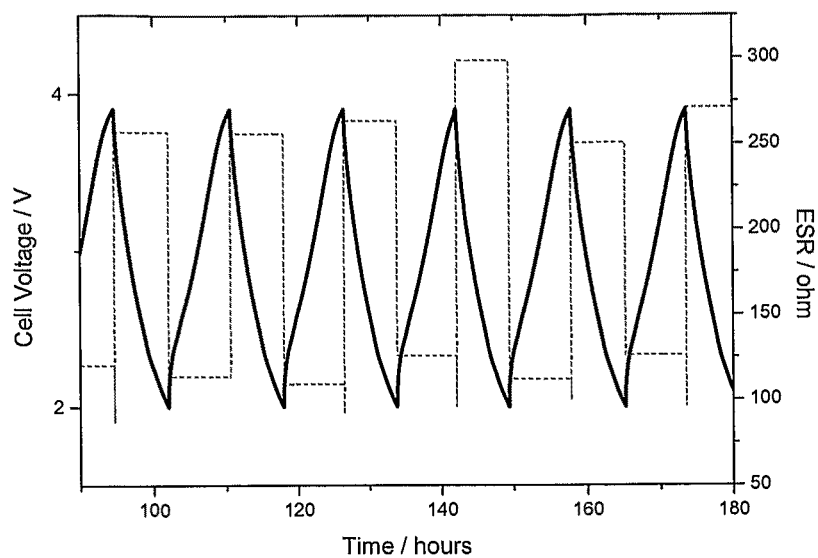
FIG. 1 is a graph showing the cycling results of a comparison conductive polymer deposited onto a fabric substrate, with the time (in hours) shown on the X axis, and cell voltage (in volts) shown on the Y axis.

The flexible electrodes of the present invention comprise a fabric substrate. The flexible electrode is suitably a flexible cathode.

The term fabric refers to woven, non-woven or knitted fabrics, textiles cloths or similar, formed from natural fibres, non-natural fibres or a combination thereof. Such natural, non-natural and combinations of fibres may be woven, knitted, felted, thermally bonded, hydroentangled, spunbonded, meltblown, electrospun or formed by other nonwoven processes, or combinations of processes, into a fabric. The term "fibre" is a broad term that encompasses loose fibres, and also yarns, threads, and the like. A "filament" refers to the separate parts that are collected together and formed into a fibre or yarn form. Synonyms for the term fabric are textile and cloth. Fabrics have voids, or a degree of porosity, which enables penetration or wetting by the electrolyte. The fabric also supports the conductive polymer, copolymer or mixture of polymers, in the case of the cathode.

Natural fibres include, notably, cellulosic fibres and proteinaceous fibres, such as cotton, hemp and wool.

Synthetic materials include carbon-containing fibres and polymers that have been made in a fibre or filament form, including polyalkylenes (and homopolymers or copolymers; examples of the homopolymers being polyacrylonitrile and polypropylene); polyamides including nylon (such as nylon 6 and nylon 66), Kevlar® and Nomex®; polyurethanes, including polyurethane block copolymers (such as Lycra®); polyureas (and block copolymers thereof such as polyurethaneureas); polyesters such as polyethylene terepthalate (PET); and synthetic cellulose-derived fibres, such as rayon, and combinations thereof. Examples of carbon-based textiles include Zorflex® and Actitex® textiles.

The fabric may itself be conductive or non-conductive.

The term "non-conductive" means that the fabric (in the absence of the electron-conductive material) is non-conductive, or has very low conductivity. Non-conductive is defined as having a surface resistivity of greater than $10^{11}$ $\Omega \cdot cm^2$ or $S \cdot cm^{-2}$. Conductive is defined as having a surface resistively of less than $10^{11}$ $\Omega \cdot cm^2$. Conductivity is the inverse of resistivity, which is measured in the art in units of inverse ohms per centimetre squared ($S \cdot cm^{-2}$).

Electron-Conductive Materials

The fabric substrate of the electrode (eg. cathode), and also the fabric substrate of the anode, may further comprise an electron-conductive material. The electron-conductive material may act as a current collector. The electron-conductive material suitably contains voids to enable penetration of the fabric substrate and the electron-conductive material by electrolyte.

Any of the electron-conductive materials known in the art can be used for this purpose. Exemplary electron-conductive materials are metals or metal alloys, such as copper, silver, nickel, aluminium, gold, titanium and so forth, and alloys thereof. Copper is of interest for use as the electron-conductive material for anodes where the electroactive anode material is lithium metal, and stainless steel for the cathode. Conductive non-metallic materials can also constitute the current collector, including conductive carbon materials such as carbon fibres and carbon nanotubes, conductive carbon yarns, conductive ceramics and conductive oxides. Conductive carbon fibres are particularly suitable. Thus, the fabric substrate and electron-conductive material could be provided by a conductive carbon cloth, if desired.

When the fabric substrate contains (and provides a support structure for) an electron-conductive material, it is important that the electron-conductive material be supported on the current collector in such a way that the fabric provides the current collector with flexibility, robustness and porosity. The amount and arrangement of electron-conductive material supported by the fabric should also not adversely impact on this to such an extent that the current collector becomes rigid, non-porous and/or mechanically weak.

The electron-conductive material is required to contain voids to enable penetration of the current collector by the electrolyte.

One fabric substrate of interest is formed by coating fibres with an electron-conductive material (such as a metal), prior to forming the fibres into a fabric using any of the woven or non-woven or knitted (or a combination thereof) fabric formation techniques described above. A fabric made from silver-coated fibres, such as a knit fabric, is an example. The term fibre in this context encompasses mono- and/or multi-filamentous fibres, threads and yarns. As a consequence of this formation technique, voids remain between the weave or network of fibres to enable penetration of the metallised fabric by the electrolyte. If the metal does not entirely coat the fibres this leaves access for the electrolyte to penetrate the fibrous network. When the electron-conductive metal material thoroughly coats the fabric fibres, this extensive metal network provides good electron transport properties.

Another type of fabric substrate comprises fabric (which may be woven or non-woven) having an array of conductive threads such as metal yarn or wires, or conductive carbon yarn extending through the fabric. The array of wires or yarn may be woven into the fabric, and the fabric may itself be a woven fabric. The array may be one in which the thread extend from one end of the fabric to another end of the fabric, to be terminated at a current collector tab, or the array may be in the form of a two-dimensional grid, or otherwise. The fabric provides a support substrate for the conductive thread array and for the active cathode material (conductive polymer). In this embodiment, the spacing between the adjacent threads may be between 0.1 mm and 20 mm, preferably 0.3-10 mm, 0.3-5 mm, 1.0 mm-10 mm, and most preferably 1.5 mm-5 mm. The conductive threads or yarns may extend in a single direction (for example the weft direction) or in both directions (for example, the warp and weft directions). Thus, these spacing distances apply to the adjacent threads extending in the same direction, and can apply to each direction independently.

Extensive testing has been conducted on suitable fabrics for use in the electrodes of the present invention, including exploration of a range of metal/wool/cotton fabrics. Fabrics tested included woven fabrics with metal (stainless steel) threads spaced in a ratio of 1 metal thread or yarn per 0.1 mm, to 1 metal thread or yarn per 200 mm in the weft direction, and in the same ratio for the warp direction. In another measure, the ratio of threads may be from 0 fabric threads to each 1 metal thread, up to 200 fabric threads to each 1 metal thread. Typically the level is around 7:1 up to 100:1 fabric:metal.

The non-metal threads, referred to as the "fabric threads", may by based on any suitable fibre, with wool, cotton and blends thereof being tested extensively. Wool or other proeinaceous fibres with metal yarns woven therethrough were found to give good energy density, and cotton with metal yarns woven therethrough were found to give better power. Blends of wool and cotton provide a good combination of these properties. Protein coatings on synthetic fibres are expected to behave similarly to the wool fibres.

Another feature of the fabric that was the subject of extensive testing and research related to the physical structural properties of the fabric, especially with respect to the fibres of the fabric. It was found that the fabric diameter, physical surface properties (eg. "scaliness" of the surface) and chemical surface properties (eg. acid pre-treated surface) impacted on the receptiveness of the fabric to the deposition of the conductive polymers, copolymer or mixture of polymers.

Generally, fibres and fabrics having high surface area, such as is provided by "scaly" surfaced and porous wool fibres, assists with loading of suitable levels of conductive polymers onto and within the fibres. This improves the efficiency of the electrode.

Pretreatment of the fabric, such as wool, with a dopant or oxidant also provides advantages in loading and deposition of the conductive polymers, copolymers and mixtures.

The fibre thickness, and tightness or looseness of the weave, also impacts on loading and deposition of the conductive polymer, copolymer or mixture of polymers.

Conductive Polymer, Copolymer, or Mixture of Polymers

The flexible cathode of the present application comprises a conductive polymer, co-polymer or mixture of conductive polymers, comprising a first component which has high specific electrochemical capacitance/capacity, and a second component which has lower specific electrochemical capacitance/capacity, lower molecular density (mol·cm$^{-3}$—as defined by the density of the conducting polymer divided by the monomer unit molecular weight) and greater conductivity compared to the first component.

Effectively, the conductive polymer component of the flexible cathode is a composite of two (or more) components, which has been found to provide the necessary balance between flexibility of the cathode, mechanical stability, conductivity (which enhances the overall capacity of the cathode), high energy density and fast charge and discharge properties compared with the individual components. In fact, the balance of properties achieved when using the composite of the two components provides a greater enhancement over the individual components than could have been anticipated. Moreover, the applicant has found a number of enhanced techniques for producing the flexible cathodes of the present invention.

"Conductive polymers" are sometimes referred to as "inherently conductive polymers" or "intrinsically conductive polymers". Conductive polymers are unsaturated polymers containing delocalised electrons and an electrical charge. The term "polymer" is used in its broadest sense to encompass homopolymers, copolymers, oligomers and so forth, unless the context is to the contrary.

Conductive polymers may be positively or negatively charged (cationic or anionic), and are associated with counter ions referred to as the dopant. Polymers of particular interest for use in the cathodes are polymerised from their polymer subunits (i.e. monomers or co-monomers) by oxidation. These will be referred to as the oxidatively polymerised conductive polymers.

The term "conductive polymers" is used in its broadest sense to refer to doped and dedoped conductive polymers, and therefore it encompasses polymers which form polaronic (including bipolaronic) moieties. Generally, polarons are the charge carrying species, and can be associated with the polymer or generated through the oxidation of the conjugated polymer backbone.

First Component

The conductive polymer, co-polymer or mixture is a composite of two components. The first component of the composite has high specific electrochemical capacity. It is noted that the specific capacity of a component is measured as the conductive homopolymer form of that component. Specific capacitance of any given conductive polymer can be determined through techniques well known in the art of the invention. An example of a document demonstrating this is Lota, K.; Khomenko, V.; Frackowiak, E. *Journal of Physics and Chemistry of Solids* 2004, 65, 295-301. The suitable minimum specific theoretical electrochemical capacitance for the first component is about 500 F/g, such as greater than 550 F/g.

Examples of conductive polymers formed from the first component that have high specific electrochemical capacitance are polyaniline and its derivatives, and polypyrrole and its derivatives, polyphenyl mercaptan, polycarbazole (and derivatives), polyindole and its derivatives, polyfuran (and derivatives), polyoxyphenazine and its derivatives, polypyridine and its derivatives thereof, polypyrimidine and its derivatives, polyquinoline and its derivatives, polybenzimidazole and its derivatives, polyanthraquinones and its derivatives and any conducting polymer where N (nitrogen) is found within its structure.

In some embodiments the language "the class of polypyrrole" or "the polypyrrole class" is used to refer to any polymer or oligomer containing a polypyrrole-based backbone. The term encompasses polypyrrole itself and all derivatives and oligomers thereof. This "class" language is used in a similar way with respect to the other classes of conductive polymers, such as the polythiophenes.

A derivative of a polymer refers to a polymer that contains the specific polymer backbone referred to above (for example, a polypyrrole backbone in the case of polypyrrole) together with one or more functional groups.

Examples of the functional groups include
mono-valent groups such as alkyl, alkenyl, alkynyl, aryl, halo, haloalkyl, haloalkenyl, haloalkynyl, haloaryl, hydroxy, alkoxy, alkenyloxy, aryloxy, benzyloxy, haloalkoxy, haloalkenyloxy, haloaryloxy, nitro, nitroalkyl, nitroalkenyl, nitroalkynyl, nitroaryl, nitroheterocyclyl, amino, alkylamino, dialkylamino, alkenylamino, alkynylamino, arylamino, diarylamino, benzylamino, dibenzylamino, acyl, alkenylacyl, alkynylacyl, arylacyl, acylamino, diacylamino, acyloxy, alkylsulfonyloxy, arylsulfenyloxy, heterocyclyl, heterocycloxy, heterocyclamino, haloheterocyclyl, alkylsulfenyl, arylsulfenyl, carboalkoxy, carboaryloxy, mercapto, alkylthio, benzylthio, acylthio, sulfonate, carboxylate, phosphonate and nitrate groups or combinations thereof, and divalent groups [—R—] which attach to the polymer backbone in two positions such as alkylene groups (—$C_xH_{2x}$—), alkylene oxy groups (—$C_xH_{2x}$—O—), alkylene dioxy groups (—O—$C_xH_{2x}$—O—), alkylene groups containing heteroatoms (eg —$C_xH_{2x}$—Z—$C_xH_{2x}$— where each x is independently 1-6 and Z is NH, O, S, etc).

The hydrocarbon groups referred to in the above list are preferably ten carbon atoms or less in length, and can be straight chained, branched or cyclic.

Second Component

The second component has a lower electrochemical capacity than the first component. Thus, the specific theoretical electrochemical capacitance for the second component is suitably below 550 F/g, or suitably below 500 F/g.

The second component additionally has a greater conductivity than the first component. The conductivity of the second component is measured as the polymer form of that component, and the conductivity is measured in $Scm^{-1}$. Typical first components in their polymeric form have a conductivity of around 0.1 $Scm^{-1}$-50 $Scm^{-1}$. In contrast, suitable second components, in their homopolymer form, have a conductivity of greater than 50 $Scm^{-1}$, such as a conductivity of at least 100 $Scm^{-1}$, or greater than 200 $Scm^{-1}$. Techniques for measuring the conductivity of any specific component that can be used in the formation of a polymer, can be determined by forming the homopolymer-form of that second component, and determining the conductivity of that polymer in accordance with known techniques in the art. Examples of documents demonstrating the calculation of conductivity of given conductive polymers include Lota et al. (referred to above in the context of specific capacity), as well as Ryu, K. S.; Kim, K. M.; Park, N. G.; Park, Y. J.; Chang, S. H. *Journal of Power Sources* 2002, 103, 305-309; Ryu, K. S.; Kim, K. M.; Park, Y. J.; Park, N. G.; Kang, M. G.; Chang, S. H. *Solid State Ionics* 2002, 152, 861-866; Stejskal J, Gilbert R. G. *Pure and Applied Chemistry* 2002 74 (5) 857-867; Faverolle F, Attias A J, Bloch B, et al. *Chemistry of Materials* 1998 10 (3): 740-752.

The second component suitably has a greater porosity (which correlates to a lower molecular density) or better morphology compared to the first component, when each of these components are considered in their pure polymer forms.

Molecular density is defined by the density of the subject conductive polymer or copolymer divided by the monomer unit molecular density, and is measured in $mol \cdot cm^{-3}$.

The relative porosity and suitability of the morphology of the first component as compared to the second component can be assessed by producing SEM images of the first component, in its homopolymer form, polymerized onto a fabric, and comparing this to the SEM of the second component, in its homopolymer form, polymerized onto a fabric. As shown in the examples, visual comparison of SEM images of the two different components enables a qualitative comparison of the morphology to be made. A smoother surface finish is the desired result, as compared to a globular morphology. BET/surface area can also be used to assess porosity and morphology.

Suitable examples of second components include thiophene and derivatives thereof, including 3,4-ethylenedioxythiophene, which is a derivative of thiophene. Suitable classes of derivatives are those derivatives containing the functional groups listed above in the context of the first component. The polymeric forms of these second components are known as polythiophene and poly(3,4-ethylenedioxythiophene), otherwise known as "pEDOT". Other derivatives of thiophene also constitute suitable second components, which in their polymeric forms, have the necessary properties of lower electrochemical capacity compared to the first component, lower molecular density, greater conductivity and improved morphology/greater porosity.

Forms of the Composite of the First and Second Components

In a first form, the first and second components are each conductive polymers which are co-deposited onto the fabric substrate from a mixture of monomers in solution, each of the monomers forming the two types of conductive polymers. This co-deposition technique results in a random deposition of the polymers throughout the co-deposited polymer layer, or mixed conductive polymer layer, on the fabric substrate, rather than a regular layered structure.

In a second form, the first and second components are each conductive polymers which are deposited separately on the fabric substrate. One layer of either the first or second component, which is constituted by one conductive polymer, is deposited followed by the alternate component as a second conductive polymer layer. This layered arrangement can be repeated a number of times. According to one embodiment, the conductive polymers form a total of up to 6 layers, suitably up to 4 layers, on the fabric substrate. In each form, the second component provides the composite with the desired morphology and conductivity, and the first component provides the desired high specific capacity. The second component also enables the high specific capacity of the first component to be maintained despite an increased thickness of conductive polymer on the fabric substrate. In contrast, if the first component is used alone to produce a further conductive polymer layer on the fabric substrate, an increase in thickness of the first component, which is of a dense growth type, results in a reduction of the overall electrochemical capacitance obtained per gram of the material, despite its high specific capacity. The more linear-growing and more porous second component provides a suitable partner for the first component which enables the growth of the first component to be improved, the conductivity of the composite being improved and the high electrochemical capacitance being maintained. Indeed, even higher electrochemical capacitance values can be obtained from the composite material compared to the individual components.

In a third form, the first and second components comprise segments of a single polymer or copolymer. In this embodiment, the components are covalently connected, optionally with other chemical groups. The first and second components therefore form part of a "co-monomer", which is polymerized to form the conductive polymer comprising the first and second components. Examples of co-monomers are illustrated below.

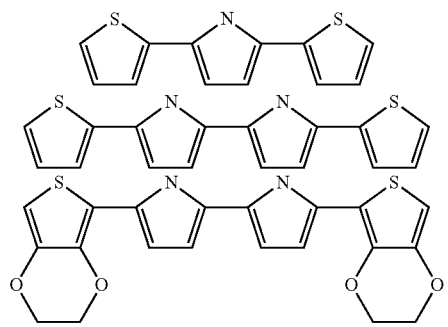

Additional Features

The relative amounts of the first component to the second component can vary between 10:90 and 90:10, by weight (M). It has been found that generally, better results are achieved when there is a greater amount of component two compared to component one. Thus, according to one embodiment the relative amounts of first component to second component are between 60:40 and 10:90, for example 50:50-15:85, or 45:55 to 15:85.

The amount of the conductive polymer, copolymer or mixture of conductive polymers is suitably between 2%-50% by weight of the fabric substrate. Suitably, the amount of conductive polymer by weight of the substrate is between 5%-50%. The amount of conducting polymer material that can be taken up by the fabric substrate is dependent on the adherence. The role of pre-treatment of various fabric substrates prior to depositions of the conducting polymer are known to those skilled in the art.

Formation Techniques

The same basic techniques can be used for forming the conductive polymer, copolymer or mixture of conductive polymers of the three different forms described above. The only difference between the processes relates to the selection of monomers in the solution during deposition onto the fabric substrate. Thus, to form the composite of the first type, the monomers in the solution include monomers of the first component type and of the second component type, which are then co-deposited onto the fabric substrate. In the case of a layered structure, at least two stages of deposition are involved, including one stage in which the solution contains monomers of the first type, and a second stage in which the solution contains monomers of the second component type. These can be applied alternately, commencing with either of the components. In the case of composites of the third type, the monomer in the solution is a "co-monomer" including segments of the first component type and the second component type.

The conductive polymer, copolymer or mixture of conductive polymers can be deposited onto the fabric substrate through any techniques known in the art, such as chemical or electrochemical deposition. Generally, for conductive polymers, the process involves oxidation of the polymer to produce a positively charged polymer, and a counterion for conductive polymer, copolymer or polymer mixture. For lithium-based energy storage devices, it is important that the counterion is stable to lithium, so that lithium can form a component of the electrolyte composition and/or the anode.

Generally, chemical and electrochemical depositing techniques involve contacting a solution of a monomer or mixture of monomers capable of forming a conductive polymer with the fabric substrate and subjecting the monomer or mixture of monomers to a chemical or electrochemical process resulting in polymerization of the polymer onto the fabric substrate, and oxidation of the polymer, copolymer or mixture of polymers.

In the case of composite conductive polymers of the first type, the solution comprises a mixture of monomers, one monomer corresponding to the first component and the second monomer corresponding to the second component. In the case of the composite conductive polymer of the second form, the depositing step is conducted in two stages, in which in a first stage a solution of either the first or second component is contacted with the fabric substrate and chemically or electrochemically deposited on the fabric substrate, and in a second stage, a second solution containing the monomer corresponding to the other of the first and second components is contacted with the fabric substrate and chemically or electrochemically deposited thereon, so that layers of conductive polymers of the first and second components are applied alternately to the fabric substrate. In the case of the third form of the composite conductive polymer, the solution comprises a monomer comprising segments of first component and second component covalently connected together, which, when polymerized, forms a conductive polymer containing the first and second components.

It has been found that a number of benefits are obtained from depositing the conductive polymer, copolymer or mixture of conductive polymers from an ionic liquid solution. As one example, the ionic liquid provides the counterion for the conductive polymer, without addition of a separate dopant. One subclass of ionic liquids of interest in this respect are the distillable ionic liquids. The N,N-dialkylammonium N',N'-dialkylcarbamates (abbreviated to "dialcarbs") are one class of particular interest. Use of these ionic liquids enable the ionic liquid solvent to be removed, recovered and re-used. A specific example of the dialcarbs is N,N-dimethylammonium N'N'-dimethylcarbamate ("DIMCARB") which may be in the form of a number of related species, in equilibrium.

In general it was found that the deposition of the conductive polymer, copolymer or mixture of conductive polymers onto the fabric substrate is best achieved through chemical deposition and oxidizing techniques. It has been found that for improved flexible cathodes can be produced from this technique. According to this embodiment, it is additionally desired that the solution of the monomer or monomers be an ionic liquid solution of the monomer or monomer mixture.

Ionic liquids are described in further detail below with reference to the electrolyte composition. The types of ionic liquids described below in the context of electrolytes can also be used as ionic liquids forming the solvent in the method for forming the flexible cathode.

In the alternative, other solvents that can be used include aqueous and organic media.

Chemical Oxidation/Deposition

Accordingly to one embodiment, the method comprises chemically depositing and oxidising the conductive polymer, copolymer or mixture of polymers onto the fabric substrate. It is preferred that the polymer, copolymer or mixture of polymers be deposited from an ionic liquid containing the monomer or mixture of monomers.

Chemical deposition is achieved by contacting an oxidant with a solution of the monomer or mixture of monomers in an ionic liquid and contacting the solution with the fabric substrate. The ionic liquid may be a distillable ionic liquid.

The amount of oxidant can be less than an equi-molar amount of oxidant to monomer. In addition, the counterion stable to lithium is provided by the ionic liquid without the addition of a separate dopant.

According to one embodiment, the anion component of the oxidant is the same as the anion of the electrolyte for the flexible energy storage device. This enables the flexible cathode to be used or inserted into an energy storage device without subjecting the cathode to ion exchange. One suitable oxidant of this type is hydrogen bis (trifluoromethanesulfonyl)imide-HTFSI or hydrogen bis(fluorosulfonyl)amide-HFSI.

Generally, suitable oxidants for performing the chemical deposition and oxidation step include Fe[III] oxidizing agents such as $FeCl_3$ (and hydrates thereof such as the hexahydrate), $AgNO_3$ and other metal nitrates, ammonium persulfate, ammonium peroxydisulfate, iron (III) chloride, salts of permanganates, peracetates, chromates and dichromates. Hydrated oxidising agents are a preferred class. These salts may also contribute to the doping effect of the conducting polymer when it is in its oxidised state. Inorganic oxidants/dopants may be derived from strong acids such as p-toluene sulfonic acid, naphthalene disulfonic acid, methane sulfonic acid, chloromethyl sulfonic acid, fluoromethyl sulfonic acid, oxalic acid, sulfosalicylic acid and trifluoroacetic acid, anthraquinone-2-sulfonic acid sodium salt. However, the dopant may be provided by the macromolecular template or another agent (for example, the acid moiety of the functional groups present in any reagent used in forming the electroconductive textile).

During oxidation and deposition of the polymer onto the fabric substrate, a metal species may also be desposited onto the substrate. For example where $AgNO_3$ is the oxidant, the deposited metal species is silver metal particles. Thus the process may comprise depositing a metal species onto the fabric substrate during oxidation and deposition of the conductive polymer, co-polymer or mixture of polymers. The metal may be deposited as nanoparticles onto the fabric substrate. Such metallic particles provide additional advantages such as an increase in conductivity of the electrode. According to one embodiment, the electrode further comprises conductive metal particles. The conductive metal particles may be nanoparticles. The conductive metal particles may be deposited onto the anode during oxidation and deposition of the conductive polymer, co-polymer or mixture of polymers.

Dopant

Dopants or doping agents provide the counterions which are associated with the conductive polymers. The counterion may be organic or inorganic.

Organic dopants correspond to the ion species that make up ionic liquids. They are not necessarily organic materials, themselves, but many examples are carbon-containing anions.

In the case of anionic dopants these may be selected from one or more of the following:
(i) $BF_4^-$ and perfluorinated alkyl fluorides of boron. Encompassed within the class are anions of the formula: $B(C_xF_{2x+1})_aF_{4-a}^-$ where x is an integer between 0 and 6, and a is an integer between 0 and 4.
(ii) Halides, alkyl halides or perhalogenated alkyl halides of group VA (15) elements. Encompassed within this class are anions of the formula $E(C_xY_{2x+1})_a(Hal)_{6-a}^-$ where a is an integer between 0 and 6, x is an integer between 0 and 6, y is F or H, and E is P, As, Sb or Bi. Preferably E is P or Sb. Accordingly this class encompasses $PF_6^-$, $SbF_6^-$, $P(C_2F_5)_3F_3^-$, $Sb(C_2F_5)_3F_3^-$, $P(C_2F_5)_4F_2^-$, $AsF_6^-$, $P(C_2H_5)_3F_3^-$ and so forth.
(iii) $C_xY_{2x+1}SO_3^-$ where x=1 to 6 and Y=F or H. This class encompasses $CH_3SO_3^-$ and $CF_3SO_3^-$ as examples.
(iv) sulfonyl amides, including the bis amides and perfluorinated versions thereof. This class includes $(FSO_2)_2N^-$ ("FSI"), $(CH_3SO_2)_2N^-$, $(CF_3SO_2)_2N^-$ (also abbreviated to $Tf_2N$ or TFSI) and $(C_2F_5SO_2)_2N^-$ as examples. The bis amides within this group may be of the formula $(C_xY_{2x+1}SO_2)_2N^-$ where x=0 to 6 and y=F or H.
(v) $C_xF_{2x+1}COO^-$, including $CF_3COO^-$.
(vi) sulfonyl and sulfonate compounds, namely anions containing the sulfonyl group $SO_2$ or sulfonate group $SO_3^-$ not covered by groups (iii) and (iv) above. This class encompasses aromatic sulfonates containing optionally substituted aromatic (aryl) groups, such as toluene sulfonate and xylene sulfonate.
(vii) cyanamide compounds and cyano group containing anions, including cyanide, dicyanamide and tricyanomethide.
(viii) Succinamide and perfluorinated succinamide.
(ix) Ethylendisulfonylamide and its perfluorinated analogue.
(x) $SCN^-$
(xi) Carboxylic acid derivatives, including $C_xH_{2x+1}COO^-$ where x is as defined above.
(xii) Weak base anions, being the weakly basic anions, such as Lewis base anions, including lactate, formate, acetate, carboxylate, dicyanamide, hexafluorophosphate, bis(trifluoromethanessulfonyl)amide, tetrafluoroborate, methane sulfonte, thiocyanate, tricyanomethide and tosylate.
(xiii) Halide ions such as the iodide ion.
(xiv) Chlorate ($ClO_3^-$) or perchlorate ($ClO_4^-$) anions.

Amongst these anions, particular classes of interest are (i), (ii), (iii), (iv) and (xiv). Particular examples include $PF_6^-$, $ClO_4^-$, $BF_4^-$, $CF_3SO_3^-$, $SbF_6$, $(CF_3SO_2)_2N^-$, $(CH_3SO_2)_2N^-$, $(FSO_2)_2N^-$.

Inorganic dopants which originate in the chemical oxidant may be derived from strong acids such as p-toluene sulfonic acid, naphthalene disulfonic acid, methane sulfonic acid, chloromethyl sulfonic acid, fluoromethyl sulfonic acid, oxalic acid, sulfosalicylic acid, nitric acid, hydrochloric acid, sulphuric acid and trifluoroacetic acid. However, the dopant may be provided by the macromolecular template or another agent (for example, the acid moiety of the functional groups present in any reagent used in forming the electroconductive textile). Oxidizing agents such as ammonium persulfate, ammonium peroxydisulfate, iron (III) chloride, salts of permanganates, peracetates, chromates and dichromates may contribute to the doping effect.

Suitably, when the electrolyte is an ionic liquid, the dopant anion is the same as the anion of the ionic liquid.

Current Collector for Cathode and Anode

As described above, the cathode may comprise an electron-conductive material which is supported by the fabric substrate. This functions as a current collector. The electron conductive material can be in the form of a metal coating, wires or threads through the fabric substrate. The same type of current collector can be used for each of the cathode and anode, or different current collectors can be used.

In fact, the current collector for each of the anode and the cathode could be formed from areas of electron conductive materials that extend through or across regions of a continuous sheet of fabric. The fabric sheet with such areas can be folded so that the anode and cathode regions overlie each other, optionally with a separator positioned therebetween. In this case, a separator may be formed from a separate material that is interposed between the folded fabric sheet which supports the active cathode material (conductive polymer) and the active anode material, or it could be a region of the fabric that contains no electon-conductive material region. Various possible arrangements are shown and discussed in our earlier application PCT/AU2007/000497, the entirety of which is incorporated herein specifically by cross-reference)

In one embodiment, each electrode (anode and cathode) of the energy storage device is formed on a region of a fabric sheet. The separator may be a fabric separator or a fibrous membrane.

Energy Storage Devices

The types of energy storage devices that are encompassed by the present application include batteries, hybrid or asymmetric supercapacitors, capacitors (supercapacitors), and so forth. The term battery encompasses single and multiple cells.

The energy storage devices are considered to be flexible in that they do not contain a rigid housing, and each of the anodes and cathodes are flexible. Of course, the devices may contain some small components such as positive and negative terminals for electrical connection to the device, which may not be flexible, and this is acceptable provided that the overall device is capable of flexing. In other embodiments, positive and negative terminals may not be required. This is especially the case if the energy storage device is integrated into a host garment, or is integrated with a device being powered by the energy storage device, or any other components or cells.

Anode

The anode comprises an active anode material of any known type that can be used with the cathode described above to produce the desired type of energy storage device. The anode suitably comprises a fabric substrate, a current collector (which may be in the form or an electron-conductive material supported by the fabric substrate or forming part or all of the fabric substrate) and active anode material. Formats and details of the same suitable types of anodes are outlined in our earlier application PCT/AU2007/000497, the entirety of which is included in this specification by cross-reference. For the application to super-capacitors, carbon anodes of the type described in a review by A. G. Pandolfo and A. F. Hollenkamp, Journal of Power Sources 157 (1), 2006, 11-27 may be used. Generally, anode materials for capacitors, including asymmetric capacitors, may be of any type known in the art.

Anode materials of particular interest are lithium metal, lithiated carbonaceous materials (such as lithiated graphites, activated carbons, hard carbons and the like), lithium intercalating metal oxide based materials such as $Li_4Ti_5O_{12}$, metal alloys such as Sn-based or Ag-based systems and conducting polymers, such as n-doped polymers, including polythiophene and derivatives thereof. For a description of suitable conducting polymers, reference is made to P. Novak, K. Muller, K. S. V. Santhanam, O. Haas, "Electrochemically active polymers for rechargeable batteries", Chem. Rev., 1997, 97, 207-281, the entirety of which is incorporated by reference.

In the construction of an energy storage device, and particularly batteries, it is common for the anode material to be deposited on a current collector (and in this case the fabric substrate) during a formation stage, from the electrolyte. Accordingly, the references to the requirement of an anode material in the anode encompass the presence of an anode-forming material in the electrolyte that will be deposited on the anode during a formation stage.

In the situation where an anode material is applied to the fabric substrate and/or current collector prior to construction of the energy storage device, this may be performed by preparing a paste of the anode material (using typical additional paste components, such as binder, solvents and conductivity additives), and applying the paste to the current collector. Examples of suitable anode material application techniques include one or more of the following:
(i) Coating;
(ii) Doctor-blading, K-bar or roller coating;
(iii) Chemical polymerisation onto the surface, in the case of the conductive polymers;
(iv) Printing, such as by ink-jet printing;
(v) Electro-deposition (this technique may involve the inclusion of redox active materials or carbon nanotubes);
(vi) Electro-spinning (this technique may involve the application of multiple layers, along with the inclusion of carbon nanotubes when applying a conductive polymer);
(vii) direct inclusion of the anode material in the polymer forming a synthetic fibre material-based fabric, through extrusion and/or electrospinning of the synthetic fibre;
(viii) vapour deposition and/or plasma reactor deposition.
(ix) Electroless deposition using chemical methods.

It is noted that the anode material may be applied in the form of the anode material itself, or in the form of two or more anode precursor materials that react in situ on the current collector. In this event, each anode precursor material can be applied separately by one or a combination of the above techniques.

Wettability of Fabric Cathode and Anode.

The surface of the fabric cathode and anode needs to be sufficiently low to be wet by the electrolyte, and to allow good penetration of the fabric cathode and anode by the electrolyte. This can be assisted by surface modification of the fabric cathode and/or anode. Surface modification is well known in the art of metal and polymer surface treatments. Any of the known surface treatment techniques known for treating metal and polymer surfaces (such as before bonding) can be used, including the following:
(i) Chemical treatment. Ion-exchange of dopant ions, acid or base are examples of chemical treatment agents.
(ii) Plasma treatment.
(iii) Ozonation.
(iv) Electrochemical treatment.

Electrolyte

In its broadest scope, any electrolyte type appropriate for the given anode and cathode materials, as known in the art, may be used.

Such electrolytes include aprotic solvent based electrolytes such as ethylene carbonate:propylene carbonate with lithium mobile ions, such as $LiPF_6$, aqueous acid electrolytes, and so forth—as is appropriate to the given anode and cathode combination.

According to one preferred embodiment, an ionic liquid electrolyte is used. In the case of a lithium based energy storage device, the ionic liquid electrolyte is suitably one that can cycle a lithium metal electrode. Suitable ionic liquids include those disclosed in PCT/AU2004/000263, the entirety of which is incorporated by reference.

Ionic liquids, which are sometimes referred to as room temperature ionic liquids, are organic ionic salts having a melting point below the boiling point of water (100° C.).

Any of the ionic liquids known in the art may be used. Particular examples of interest are salts of the di- or tri-substituted imidiazolium-pyridinium-, pyrrolidinium-, phosphonium- and piperidinium-based cations. Such cations are based on a pyridinium, di- or tri-substituted imidiazolium, pyrrolidinium or a piperidinium ring structure, with optional substitution at one or more of the ring carbon atoms, and two alkyl or halogenated alkyl substituents at the ring nitrogen atom. The alkyl or halogenated alkyl groups on the ring nitrogen atom may be the same or different, and are typically different. Typically the N-substitutents on the ring are N-methyl, N-(ethyl, propyl, butyl, pentyl or hexyl).

The anion counterion may be any counterion that forms an ionic liquid with the cation component (such as the pyridinium, pyrrolidinium or piperidinium cation component). Suitable examples of anions are as follows:
(i) bis(trifluoromethylsulfonyl)imide (the term "amide" instead of "imide" is sometimes used in the scientific literature) or another of the sulfonyl imides, including the bis imides and perfluorinated versions thereof. This class includes $(CH_3SO_2)_2N^-$, $(CF_3SO_2)_2N^-$ (also abbreviated to $Tf_2N$ or TFSI), $(FSO_2)_2N^-$ and $(C_2F_5SO_2)_2N^-$ as examples. The bis imides within this group may be of the formula $(C_xY_{2x+1}SO_2)_2N^-$ where x=0 to 6 and Y=F or H.
(ii) $BF_4^-$ and perfluorinated alkyl fluorides of boron. Encompassed within the class are anions of the formula $B(C_xF_{2x+1})_aF_{4-a}^-$ where x is an integer between 0 and 6, and a is an integer between 0 and 4.
(iii) Halides, alkyl halides or perhalogenated alkyl halides of group VA(15) elements. Encompassed within this class are anions of the formula $E(C_xY_{2x+1})_a(Hal)_{6-a}^-$ where a is an integer between 0 and 6, x is an integer between 0 and 6, y is F or H, and E is P, As, Sb or Bi. Preferably E is P or Sb. Accordingly this class encompasses $PF_6^-$, $SbF_6^-$, $P(C_2F_5)_3F_3^-$, $Sb(C_2F_5)_3F_3^-$, $P(C_2F_5)_4F_2^-$, $ASF_6^-$, $P(C_2H_5)_3F_3^-$ and so forth.
(iv) $C_xY_{2x+1}SO_3^-$ where x=1 to 6 and Y=F or H. This class encompasses $CH_3SO_3^-$ and $CF_3SO_3^-$ as examples.
(v) $C_xF_{2x+1}COO^-$, including $CF_3COO^-$ (vi) sulfonyl and sulfonate compounds, namely anions containing the sulfonyl group $SO_2$, or sulfonate group $SO_3^-$ not covered by groups (i) and (iv) above. This class encompasses aromatic sulfonates containing optionally substituted aromatic (aryl) groups, such as toluene sulfonate and xylene sulfonate (vii) cyanamide compounds and cyano group containing anions, including cyanide, dicyanamide and tricyanomethide (viii) Succinamide and perfluorinated succinamide (ix) Ethylendisulfonylamide and its perfluorinated analogue (x) $SCN^-$ (xi) Carboxylic acid derivatives, including $C_xH_{2x+1}COO^-$ where x is an integer between 1 and 6

(xii) Weak base anions, being the weakly basic anions, such as Lewis base anions, including lactate, formate, acetate, carboxylate, dicyanamide, hexafluorophosphate, bis(trifluoromethanesulfonyl)amide, tetrafluoroborate, methane sulfonte, thiocyanate, tricyanomethide and tosylate (xiii) Halide ions such as the iodide ion.

Amongst these anions, the preferred classes are those outlined in groups (i), (ii), (iii), (iv) and (vi) above, and particularly group (i). Particular examples include $PF_6^-$, $ClO_4^-$, $BF_4^-$, $CF_3SO_3^-$, $SbF_6$, $(CF_3SO_2)_2N^-$, $(CH_3SO_2)_2N^-$, $(FSO_2)_2N^-$.

The term "alkyl" is used in its broadest sense to refer to any straight chain, branched or cyclic alkyl groups of from 1 to 20 carbon atoms in length and preferably from 1 to 10 atoms in length. The term encompasses methyl, ethyl, propyl, butyl, s-butyl, pentyl, hexyl and so forth. The alkyl group is preferably straight chained. The alkyl chain may also contain hetero-atoms, a halogen, a nitrile group, and generally other groups or ring fragments consistent with the substituent promoting or supporting electrochemical stability and conductivity.

Halogen, halo, the abbreviation "Hal" and the like terms refer to fluoro, chloro, bromo and iodo, or the halide anions as the case may be.

The bis(trifluoromethylsulfonyl)imide salts of N-ethyl N-methyl pyrrolidinium bis(trifluoromethylsulfonyl)imide melt at 86° C., N-propyl N-methyl pyrrolidinium bis(trifluoromethylsulfonyl)imide at 13° C. and N-butyl N-methyl pyrrolidinium bis(trifluoromethylsulfonyl)imide at −18° C., in the absence of Li salt or other additives. The melting points vary with additives, but are most often lower. Thus, the appropriate cation can be selected to provide an electrolyte composition that is liquid at the typical usage temperatures and has the required stability and cycle life for the applications envisaged.

In the case of ionic liquid electrolytes for lithium-based energy storage devices, the electrolyte contains lithium mobile ions, otherwise referred to as a lithium dopant. This may be included in the electrolyte in the form of a lithium salt, comprising lithium ions and counterions. The counterion may be the same as the counterion for the ionic liquid, or it may be different. It is typically the same. The amount of the lithium can be between 0.01% and 90% of the overall ionic liquid by weight, preferably between 1 and 49% by weight. It is usual to refer to the lithium concentration of the electrolyte in moles of lithium ions per kilogram of total electrolyte, and in this unit the lithium is suitably present in an amount of from 0.01 to 2.0 mol/kg. Suitable amounts may be in one of the following ranges: 0.1-1.5 mol/kg, 0.2-1.5 mol/kg, 0.2-0.6 mol/kg, 0.4-1.5 mol/kg, 0.6-1.5 mol/kg, 0.8-1.5 mol/kg, 0.6-1.2 mol/kg, 0.8-1.2 mol/kg.

The electrolyte may comprise one or more further components, including one or more further room temperature ionic liquids, one or more solid electrolyte interphase-forming additives; one or more gelling additives; counterions to the lithium ions which are either the same as or different to the anions of the room temperature ionic liquid; and organic solvents.

Solid electrolyte interphase-forming additives improve the deposit morphology and efficiency of the lithium cycling process. The gelling additives provide a gel material while retaining the conductivity of the liquid.

The use of ionic liquid electrolyte has a number of advantages in terms of safety, and ability to cycle the lithium metal electrode (where the energy storage device is lithium-based). Such electrolytes have negligible vapour pressure and limited flammability, meaning that the risk of explosion is extremely low. In addition, they have low toxicity in the event of any leakage. This is of particular importance in military applications, where there is a risk of puncture of energy storage devices, especially in a combat situation.

Separators

The separator may be of any type known in the art. A range of fabric or fibrous membrane-based separators are available, and are suitable for use in the device of the present application. Additionally, electrospun fibres could be directly applied to the cathode structure to form a separator.

Stack Pressure

In an energy storage device, it is important to maintain stack pressure across the cell (anode, cathode and electrolyte combination) to provide low ESR values and low self-discharging rates. In the present application, where the anodes and cathodes are based on fabric, and preferably the separator is a fabric-based separator, any techniques known in the art of textiles may be used to secure the anode-separator-cathode layers together. Suitable techniques include stitching or weaving (for example, in the Jacquard style), gluing or lamination of the layers together.

Applications

There is also provided an article comprising a flexible energy storage device as described above. Such articles include garments, jackets, medical articles such as monitoring devices for medical applications or otherwise, bandages and wound dressings, military equipment, portable electronic devices, mobile (cell) phones, radios and so forth.

In the case of garments that host a flexible energy storage device, it is desired that the textile properties of the garment not be significantly affected by the flexible energy storage device, in terms of thermal properties, mechanical properties, moisture management, barrier and airflow properties.

Mechanical properties relate to the strength, elasticity and drape of the fabric.

Thermal properties relate to the heat flow properties through the host garment. The adverse impact of the presence of the flexible energy storage device on the thermal properties the host garment can be mitigated by phase change materials such as everlast fabrics and the use of highly thermally conductive materials in the energy storage device (metal and carbon nanotube).

Moisture management refers to the moisture flow and wicking of material through hydrophobic and hydrophilic regions of the host garment.

Barrier properties relates to the exclusion properties of the host garment to certain sized particles or dangerous biomaterials.

Airflow relates to air flow properties from and to the person wearing the garment.

These properties can be achieved through appropriate selection of integers of the flexible energy storage device and design of the garment, and physical design of the energy storage device.

Further Embodiments

According to one embodiment, there is provided a flexible electrode comprising:
- a fabric substrate;
- a first conductive polymer which is of the polypyrrole class;
- a second conductive polymer which is of the polythiophene class; and
- a counterion stable to lithium.

According to another embodiment, there is provided a flexible electrode comprising:
- a fabric substrate;
- a first conductive polymer;
- a second conductive polymer which is different to the first conductive polymer; and
- a counterion stable to lithium.

The first conductive polymer may be selected from the classes of polypyrroles, polyanilines, polyphenyl mercaptans, polycarbazoles, polyindoles, polyfurans, polyoxyphenazines, polypyridines, polypyrimidines, polyquinolines, polybenzimidazoles and polyanthraquinones.

The second conductive polymer is preferably of the polythiophene class. It may, for example, be polyethylenedioxythiophene.

According to another embodiment, there is provided a flexible energy storage device comprising a flexible housing, a flexible electrode of one of the embodiments described above as the cathode, a flexible anode and an electrolyte.

Interpretation

References to "a" or "an" should be interpreted broadly to encompass one or more of the feature specified. Thus, in the case of "an anode", the device may include one or more anodes.

In this application, except where the context requires otherwise due to express language or necessary implication, the word "comprise" or variations such as "comprises" or "comprising" is used in an inclusive sense, i.e. to specify the presence of the stated features but not to preclude the presence or addition of further features.

EXAMPLES

The invention will now be described in further detail with reference to the following examples of cathodes and energy storage devices of embodiments of the invention, and with reference to some experimental work demonstrating the properties of the flexible cathodes.

| Abbreviations | |
|---|---|
| Py | pyrrole |
| pPy | polypyrrole |
| EDOT | 3,4-ethylenedioxythiophene |
| pEDOT | poly(3,4-ethylenedioxythiophene) |
| AQSA | anthraquinone-2-sulfonic acid sodium salt |
| FSI | bis(fluorosulfonyl imide) |
| BMMIm FSI | 1-butyl-2-methyl-3-methylimidazolium bis(fluorosulfonyl)imide |
| TFSI | bis(trifluoromethansulfonyl)imide |
| LiTFSI | lithium bis(trifluoromethansulfonyl)imide |
| ESR | Equivalent Series Resistance |
| $P_{13}$ | N-methyl N-propyl pyrrolidinium |
| $P_{14}$ | N-methyl N-butyl pyrrolidinium |

-continued

| Abbreviations | |
|---|---|
| $P_{14}$TFSI | N-methyl N-butyl pyrrolidinium bis(trifluoromethansulfonyl)imide |
| SEM | scanning electron migrograph |

Figure 16:
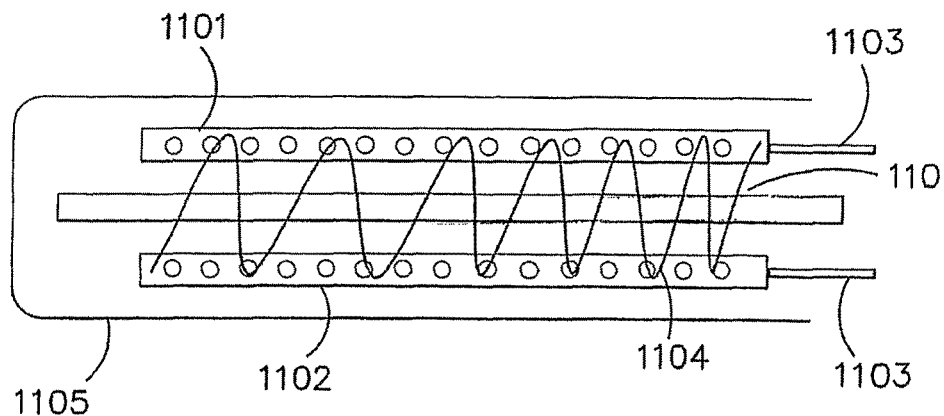
FIG. 16 is a plan view of an energy storage device of one embodiment of the invention.

An energy storage device comprising a fabric cathode of one embodiment of the present invention is illustrated in FIG. 16. The energy storage device comprises a fabric cathode 101, an anode which includes a fabric substrate 102, two current collector tabs 103, one for each of the cathode an anode. The anode, cathode and separator, all being made of a fabric substrate, are sewn together by thread 104. The anode, cathode and separator are all contained within a housing 105, and the housing is filled with an electrolyte (not illustrated), which contacts the cathode and anode.

Although not illustrated in detail in FIG. 16, the fabric cathode comprises a woven fabric substrate (or knit) in which stainless steel fibres are found at regular intervals to act as a current collector, and a composite conductive polymer mixture, which comprises co-deposited poly(pyrrole) and pEDOT poly(3,4-ethylenedioxythiophene). The counterion is any counter-ion known to be stable to lithium metal, preferably one that is common to that found in the electrolyte, eg. TFSI or FSI. The electrolyte is any known to be stable to lithium metal, such as $P_{13}$ TFSI+0.5 mol·kg$^{-1}$ LiTFSI or $P_{13}$FSI+0.5 mol·kg$^{-1}$.LiTFSI or BMMIm FSI+0.5 mol/kg LiTFSI.

In test work, the fabric substrate comprised wool, cotton, or a blend of cotton, with stainless steel yarn of 0.049 mm diameter woven through at different spacings. The stainless steel thread used in the Examples was 316L stainless steel nanofilament yarn from Hangzhou Dunli S.S. Fine Wire Co., of China. Other metal threads of diameters between 1 mm and 0.01 mm can be used, such as threads between 0.1 mm and 0.01 mm in diameter.

Figure 17:
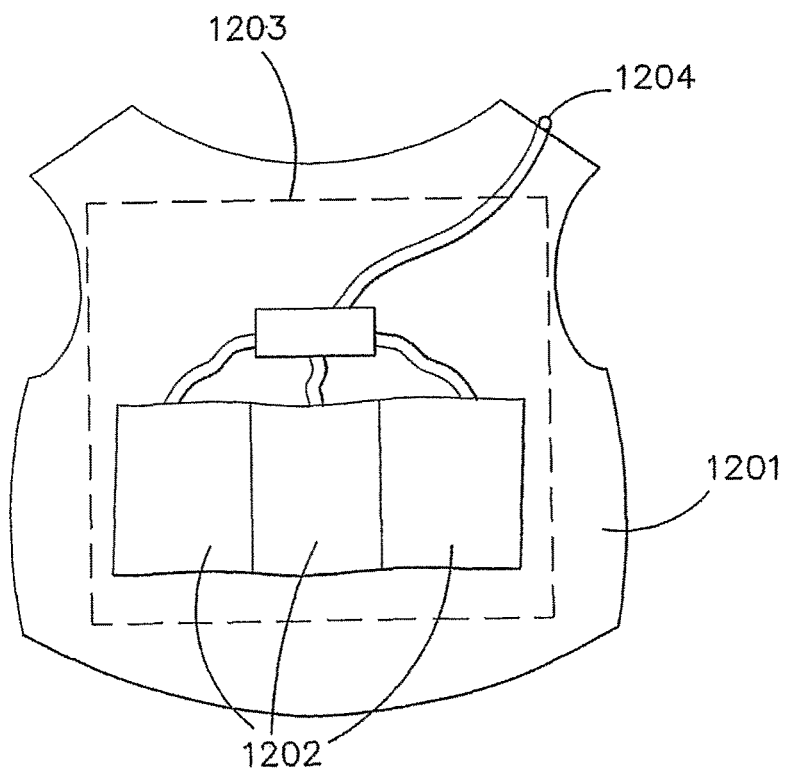
FIG. 17 is a side view of a garment containing the energy storage device of an embodiment of the invention.

The energy storage device of the present invention can be formed into an article of manufacture such as a garment, as illustrated in FIG. 17. The garment 201 comprises energy storage devices 202 within a panel 203 which are connected via lead 204 to an electrically powered device.

A detailed description of the fabric substrate, including electron-conductive material supported thereon, such as threads of metal woven through the fabrics, is provided in our earlier patent application PCT/AU2007/000497. The fabric substrates including the electron conductive material, used as current collectors described in that application, are similarly used as the fabric substrate/current collector in the present application.

In the following examples, we have shown that combinations of polymers containing a first component which provides high electrochemical specific capacity, whilst being brittle, dense and resistive, with second components which have low capacity but are mechanically robust, porous and conductive, provide ideal cathodic materials for flexible energy storage devices. It is also important when considering these materials to ensure that they are capable of deposition onto the types of substrates considered for flexible devices, and remain stable in this environment. This is not simple to predict from any prior knowledge there may be on the individual polymer components when used in different applications.

In the following test work, electrical resistance (the converse of conductivity) was measured by the following technique. A 4 cm×4 cm sample of the fabric (which may be treated fabric) is placed on a rig consisting of 2 copper bars spaced 1 cm apart on a perspex base, with a second set of copper bars placed on top. The fabric sample is settled for 1 minute under the pressure of a 1 kg weight. Following settling a Hewlett Packard HP 3458A digital multimeter is used to measure the resistance values. The electrical resistance values are converted to electrical resistivity (/square) by multiplying the resistance value by the length of the fabric along the bars (cm), divided by the bar separation (in this case, 1 cm), to correct for the influence of any differing fabric dimensions.

Example 1

Demonstration of Improved Cycling Results Obtained for Composites of Polypyrrole and Poly EDOT, Compared With the Individual Polymers Utilised Alone In the following example, we have demonstrated that the cycling properties of a fabric cathode containing a composite of two conducting polymers, polypyrrole and polyEDOT, is enhanced compared to the properties of a fabric cathode comprising the individual polymers.

Polypyrrole has very low conductivity and as such, its capacity decreases with increasing thickness. PolyEDOT has high conductivity and but relatively low capacity. The properties of each material, and other suitable components of each type, are shown in Table 1.

| Advan. | CP | Mw/ g·mol$^{-1}$ | Density/ g·cm$^{-3}$ | Molecular Density/ mol·cm$^{-3}$ | Dopant level | Potential Range/ V | Specific Cap/ F·g$^{-1}$ | Conductivity/ Scm$^{-1}$ | Disadv. |
|---|---|---|---|---|---|---|---|---|---|
| High capacity | PAni | 93 | 1.245 | 0.013 | 0.5 | 0.7 | 750 | 0.1-5 | Brittle |
|  | PPy | 67 | 1.42 | 0.021 | 0.33 | 0.8 | 620 |  10-50 | Dense Resistive |
| Mechanical |  |  |  |  |  |  |  |  |  |
| Porous | PTh | 84 | — | — | 0.33 | 0.8 | 485 | 300-400 | Low |
| Conductive | PEDOT | 142 | 1.4 | 0.0098 | 0.33 | 1.2 | 210 | 300-500 | capacity |

In a first example, cycling tests were performed on fabrics containing, firstly, polypyrrole, secondly, polyEDOT, and thirdly, a composite conductive polymer of polypyrrole and polyEDOT. The cycling results are illustrated in FIGS. 1, 2 and 3, respectively.

FIG. 1 shows the cycling results of an "islands in the sea" fabric with a polypyrrole coating with an approximate loading of 4 mg (equating to ~20% of the fabric weight). 'Islands in the sea' fibres are prepared from a bi-component extrusion of a water soluble polymer (Eastman AQ™ 55S, polyester), making up the 'sea' component and another insoluble polymer (BASF Ultramid BS700 13085C pellets) which makes up the 'islands' within each fibre. The yarn is composed of 70 fibres (each fibre has 37 islands). The yarn is knitted into a fabric and when washed in warm water, the soluble 'sea' component within the yarn is dissolved, leaving only the island components. This procedure greatly enhances the surface area to be coated with conducting polymer, at the same time as reducing the bulk and mass of the overall fabric. The fabric is dried under vacuum to remove any adsorbed moisture, before being weighed and taken into an argon glove box. A CR20/32 coin cell is prepared, whereby a disc of fabric is cut and placed in the bottom of the can. 5 drops of electrolyte, 1-butyl-2-methyl-3-methylimidazolium bis(fluorosulfonyl) imide (BMMIm FSI)+0.5 mol/kg Lithium bis(trifluo-romethansulfonyl)imide (LiTFSI), is added to the fabric to "wet" the sample. It is noted that the techniques described in Example 3 were utilised to ensure the electrolyte sufficiently wetted the fabric sample. Once the cathode is wetted, a separator slightly larger than the cathode is used (in this case DSM Solupor®, dried under vacuum for 24 hours at 40° C. prior to use) to which two drops of electrolyte is placed. A lithium disk is prepared by cleaning the surface with hexane to remove any nitrides or oxides, before applying this to the separator. A stainless steel spacer and spring is then put in before sealing the cell. Cells are then cycled at both 20° C. and 50° C. at a range of capacity rates (C-rates). The cycling results are shown in FIG. 1. In FIG. 1 the solid line is cell voltage. The discharge capacity of the cell was ~0.45 mAh, the Capacitance ~1.03 F (equivalent to 25 mAh·g$^{-1}$, 47 F·g$^{-1}$ per positive active electrode material mass), the Equivalent Series Resistance ESR (defined as the change in voltage on change in current (dV/dI) when going from a rest—no current—at a step time of 10 msecs to either a constant current charge or discharge) ~2000 ohm, ESR (discharge) ~266 ohm which has been measured at ~0.1 C at 50° C.

Figure 2:
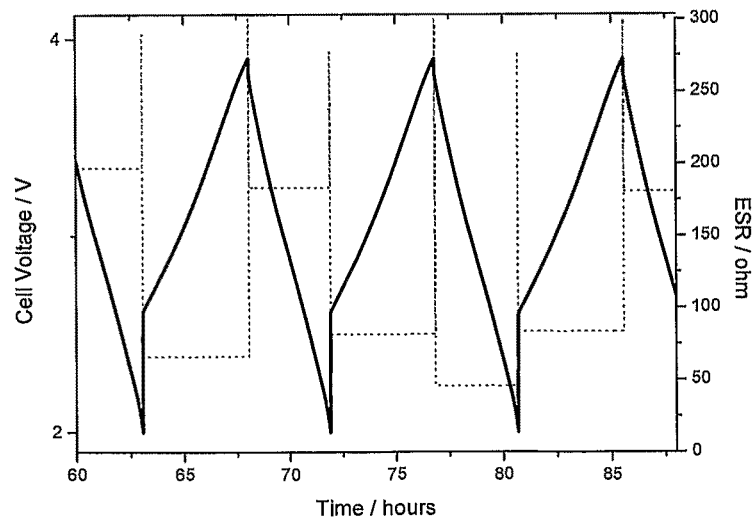
FIG. 2 is a graph showing the cycling results of a second comparison conductive polymer deposited onto a fabric substrate, with the time (in hours) shown on the X axis, cell voltage (in volts) shown on the Y axis (left side) as a solid line and ESR (in ohms) on the Y axis (right side) in a dashed line.

FIG. 2 shows the cycling results of a nylon fabric with a polyEDOT coating with an approximate loading of 4 mg (equating to ~20% of the fabric weight). The fabric is dried under vacuum to remove any adsorbed moisture, before being weighed and taken into an argon glove box. A CR20/32 coin cell is prepared, whereby a disc of fabric is cut and placed in the bottom of the can. 5 drops of electrolyte, 1-Butyl-2-methyl-3-methylimidazolium bis(fluorosulfonyl)imide (BMMIm FSI)+0.5 mol/kg Lithium bis(trifluoromethansul-fonyl)imide (LiTFSI), is added to the fabric to "wet" the sample. It is noted that the techniques described in Example 3 were utilised to ensure the electrolyte sufficiently wetted the fabric sample. Once the cathode is wetted, a separator slightly larger than the cathode is used (in this case DSM Solupor®, dried under vacuum for 24 hours at 40° C. prior to use) to which two drops of electrolyte is placed. A lithium disk is prepared by cleaning the surface with hexane to remove any nitrides or oxides, before applying this to the separator. A stainless steel spacer and spring is then put before sealing the cell. Cells are then cycled at both 20° C. and 50° C. at a range of capacity rates (C-rates). The cycling results are shown in FIG. 2. In FIG. 2, the solid line is cell voltage, dashed line ESR (Equivalent Series Resistance). The discharge capacity of the cell is ~0.054 mAh, Capacitance ~0.08 F (equivalent to 14 mAh·g$^{-1}$, 20 F·g$^{-1}$ per positive electrode active material mass) ESR (charge) ~50-80 ohm, ESR (discharge) ~170-200 ohm, measured at ~0.1 C at 50° C.

Figure 3:
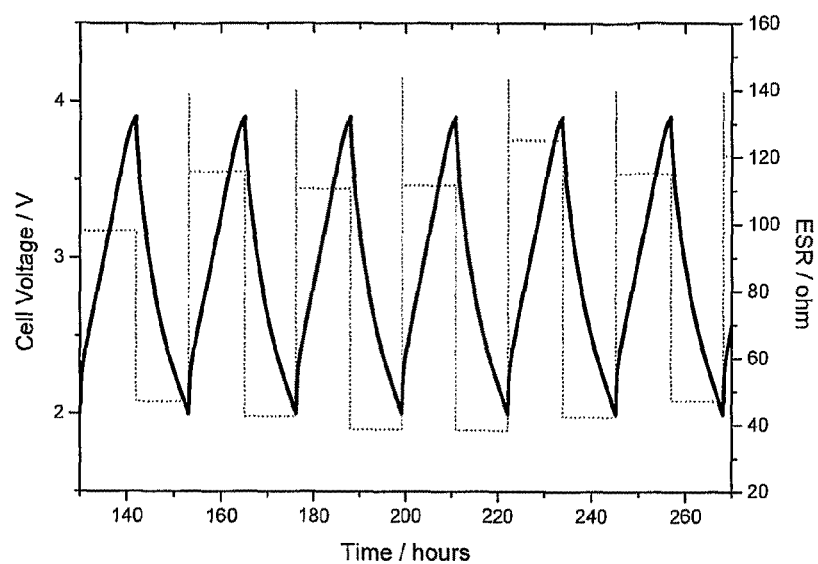
FIG. 3 is a graph showing the cycling results of conductive polymers co-deposited onto a fabric substrate of one embodiment of the invention, with the time (in hours) shown on the X axis, and cell voltage (in volts) shown on the Y axis.
Figure 4:
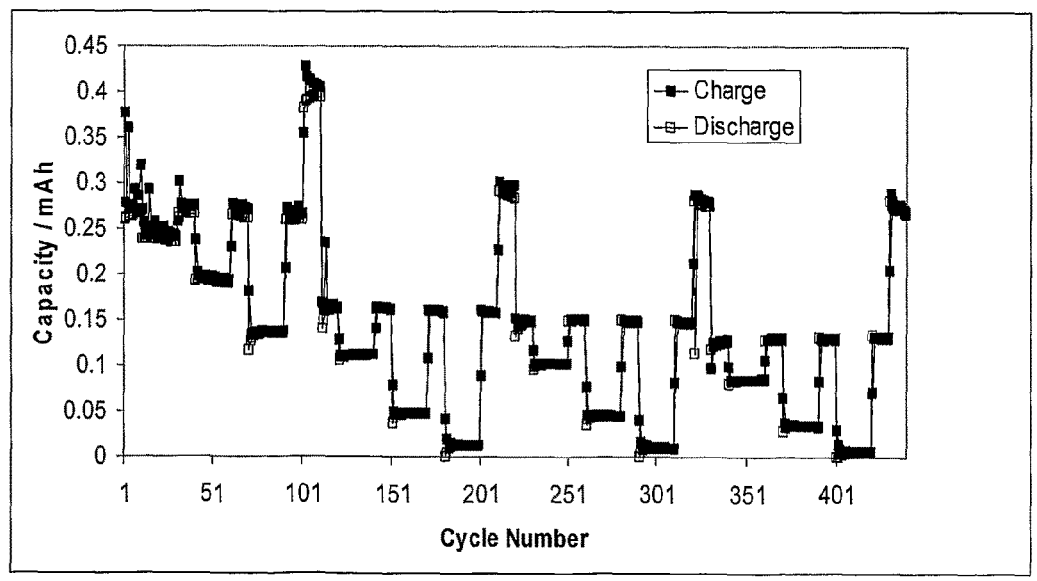
FIG. 4 is a graph of capacity (mAh) versus cycle number for the embodiment of FIG. 3. The closed squares show the charge capacity and the open squares show the discharge capacity.

FIG. 3 shows the cycling results of a cell containing as the cathode a wool fabric with a polypyrrole and polyEDOT coating prepared using the technique of Example 3 below using organic and aqueous media to layer pPy and PEDOT with an approximate loading of 8.9 mg (equating to ~22% of the fabric weight). The fabric is dried under vacuum to remove any adsorbed moisture, before being weighed and taken into an argon glove box. A CR20/32 coin cell is prepared, whereby a disc of fabric is cut and placed in the bottom of the can. 5 drops of electrolyte, 1-Butyl-2-methyl-3-methylimidazolium bis(fluorosulfonyl)imide (BMMIm FSI)+0.5 mol/kg Lithium bis(trifluoromethansulfonyl)imide (LiTFSI), is added to the fabric to "wet" the sample. It is noted that the techniques described in Example 3 were utilised to ensure the electrolyte sufficiently wetted the fabric sample. Once the cathode is wetted, a separator slightly larger than the cathode is used (in this case DSM Solupor®, dried under vacuum for 24 hours at 40° C. prior to use) to which two drops of electrolyte is placed. A lithium anode in the form of a lithium disk is prepared by cleaning the surface with hexane to remove any nitrides or oxides, before applying this to the separator. A stainless steel spacer and spring is then put before sealing the cell. Cells are then cycled at both 20° C. and 50° C. at a range of capacity rates (C-rates). The cycling results are shown in FIG. 3. In FIG. 3, the discharge capacity of the cell is ~0.67 mAh, the Capacitance ~1.3 F (equivalent to 38 mAh·g$^{-1}$, 85 F/g per positive active electrode material mass) ESR (charge) ~110 ohm, ESR (discharge) ~45 ohm, charged and discharged at ~0.1 C at 50° C. FIG. 4 shows the long term cycling results of the same cell described in context of FIG. 3 above. The cell comprises a cathode comprising polypyrrole and polyEDOT on a wool fabric, a lithium anode, separator and an electrolyte of BMMIm FSI 0.5 mol/kg LiTFSI. The closed squares show the charge capacity and the open squares show the discharge capacity. The cathode material has been cycled at various rates. It should be noted at 0.1 C charge and discharge, the cathode shows no loss in capacity over 450 cycles.

Example 2

Cyclic Voltammetry Test Results for Composite Co-Deposited Polypyrrole and polyEDOT Compared to the Polymers Alone Polypyrrole has low conductivity and is dense, and as such, its capacity decreases with it increasing thickness. PolyEDOT has high conductivity and is porous but has a relatively low capacity. In this example, we prepared comparative cyclic voltammetry results for polypyrrole alone, polyEDOT alone, and a copolymer of the two polymers. We also calculated the specific capacitance per surface area (F·cm$^{-2}$) versus deposition charge (C·cm$^{-2}$) of the homopolymers and the copolymers. Thirdly, we qualitatively assessed the morphology of polypyrrole chemically polymerised onto wool fabric, and compared this to co-deposited polypyrrole and polyEDOT.

Figure 5:
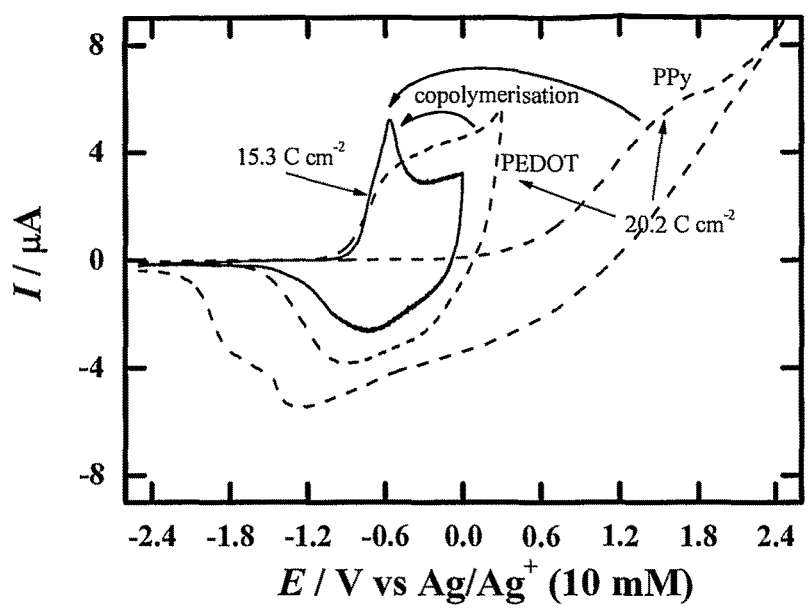
FIG. 5 is a cyclic voltammogram for co-polymerisation onto a fabric substrate according to an embodiment of the invention (as a solid line), and for the individual polymers polypyrrole and polyEDOT as broken lines.

In FIG. 5, the effect of growing homopolymers (pEDOT and pPy) versus growing the copolymer (pEDOT-pPy) is shown. The cyclic voltammetry is drawn out for pPy (in particular) and pEDOT. Large over-voltages are required to insert the counter-ions and oxidise the polymer (indicating slow kinetics). However, with the copolymer, the cyclic voltammetry is sharp with a clearly defined "super-capacitive" region. Specific capacitances are similar for each type of layer considering the charges used to deposit. The cyclic voltammetry results shown in FIG. 5 were performed at 20 mVs$^{-1}$ on 20.2 Ccm$^{-2}$ thick layers of pEDOT and pPy grown from 6M solutions compared with the copolymer grown from 75:25 EDOT:Py (6M:4M) to a charge of 15.3 Ccm$^{-2}$.

Figure 6:
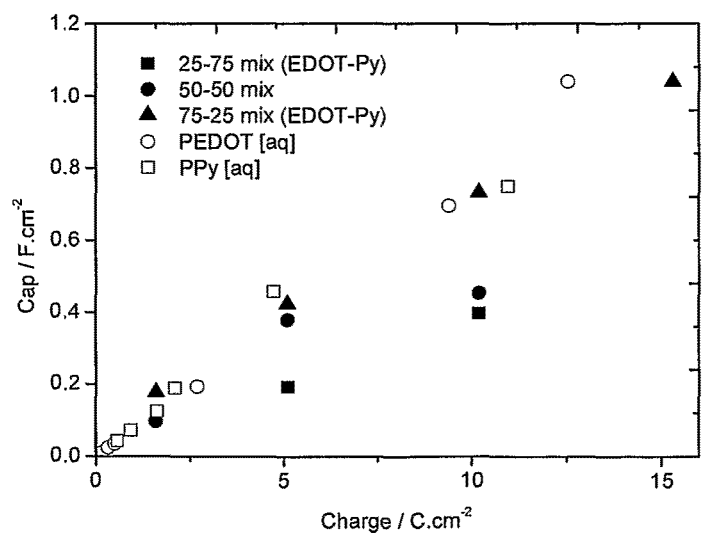
FIG. 6 is a graph of deposition charge ($C \cdot cm^{-2}$) versus Area Specific Capacitance ($F \cdot cm^{-2}$) of the comparison homopolymers polypyrrole (open squares) and polyEDOT (open circles) grown in aqueous media, and for varying ratios of the two polymers co-deposited from ionic liquid in accordance with an embodiment of the invention—with the filled in squares representing a 25:75 mixture of EDOT:Py, the filled in circles representing a 50:50 mixture of EDOT:Py, and the filled in triangle a 75:25 mixture of EDOT:Py.

Using various ratios of EDOT:Py monomer in the ionic liquid (P$_{14}$TFSI) varying amounts of polymer layer were grown on a platinum electrode. An indication of thickness is the charge used to deposit the polymer. This charge will relate directly to the amount (weight, grams) of material attached to the electrode. Shown in FIG. 6 is the capacitance obtained from varying amounts of polymer (thicknesses) attached to the electrode. A linear increase in capacitance with deposition charge indicates a sufficiently porous layer such that the interior sites are not blocked and are accessible to electrolyte. In other words, the maximum capacitance is obtainable. For comparison purposes aqueous growth of pEDOT and pPy are included in the figure and show that PEDOT grows linearly as it is porous in nature and pPy is limited at the large thicknesses due to the dense growth. It is seen in FIG. 6 that the 75-25 mix of EDOT-Py grows the best layers with a linear relationship with amount of polymer deposited and a large capacitance value. The behaviour appears to be intermediate between that of pPy and pEDOT layers.

Figure 7:
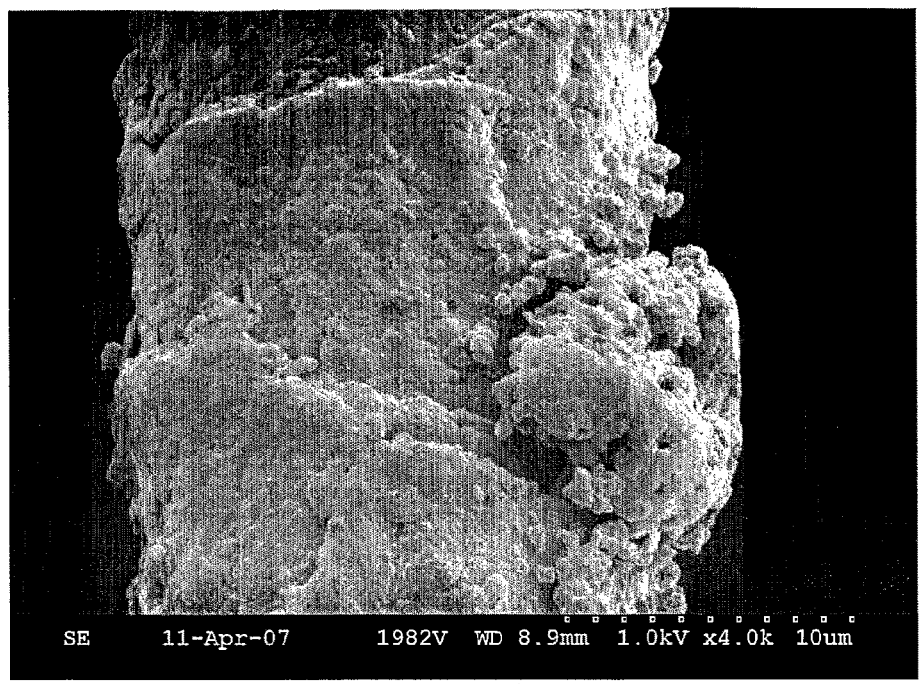
FIG. 7 is a scanning electron micrograph (SEM) of polypyrrole deposited onto a wool substrate, in accordance with a comparison example.
Figure 8:
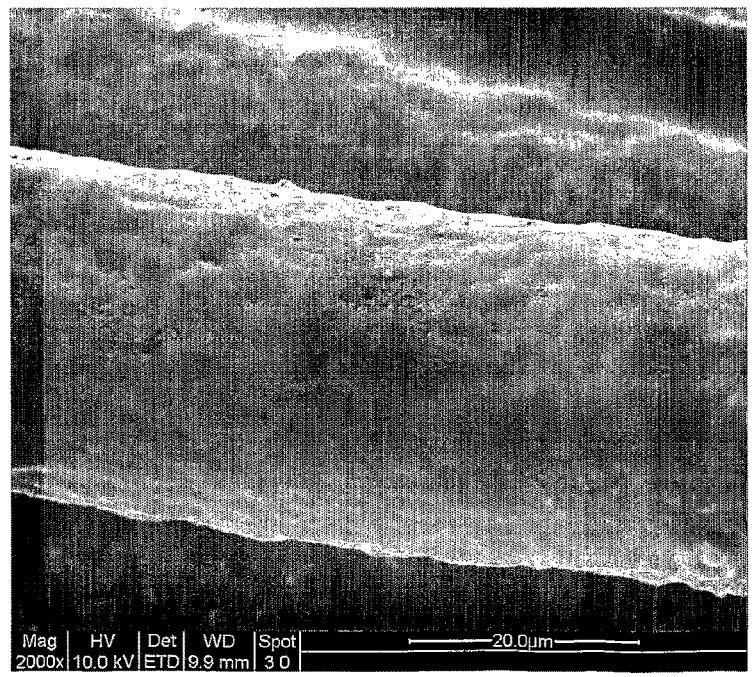
FIG. 8 is a scanning electron micrograph (SEM) of a 75:25 mixture of EDOT:Py co-deposited onto a silver-coated knit fabric substrate, in accordance with one embodiment of the invention.
Figure 20:
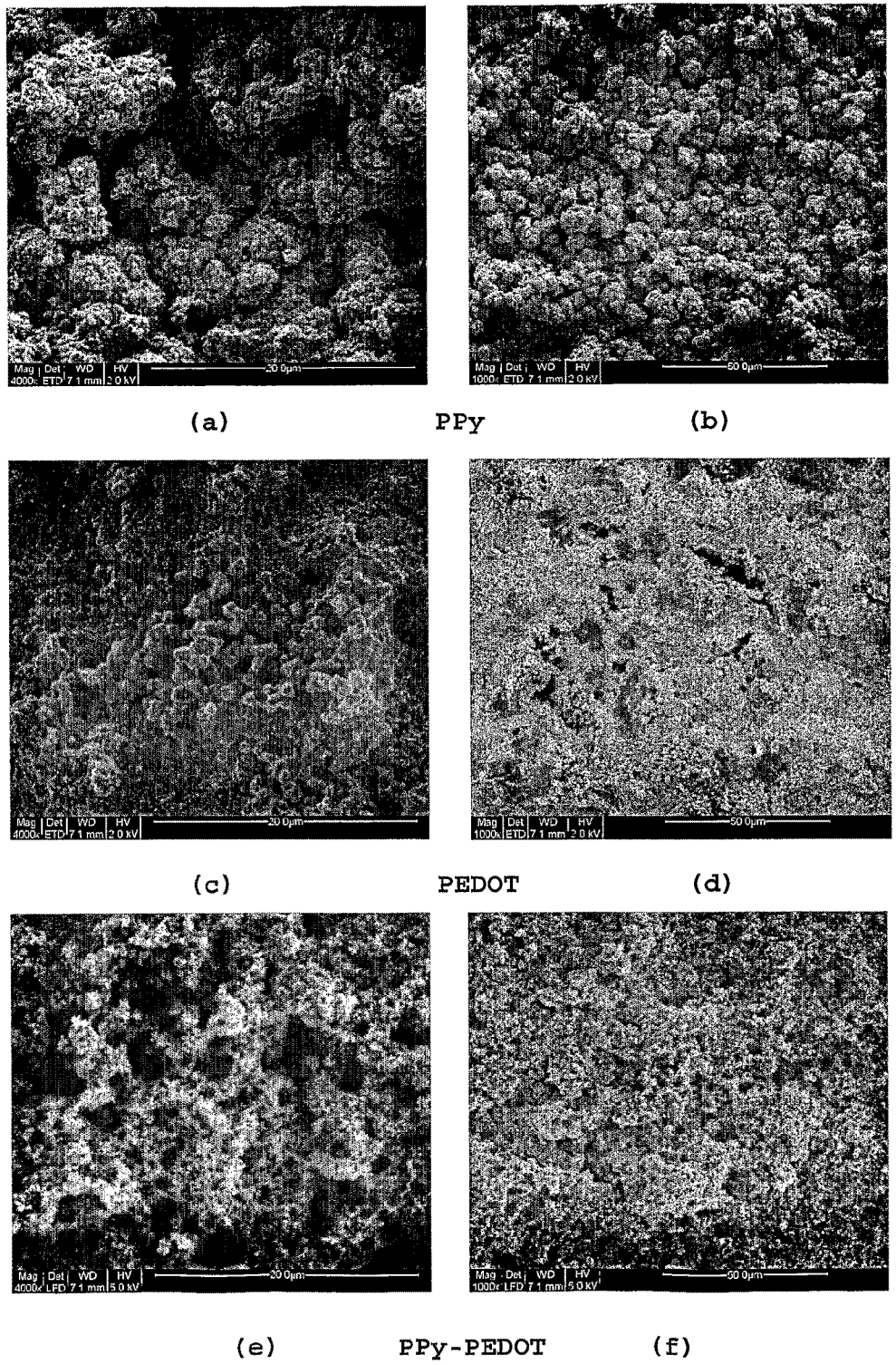
FIG. 20 is a scanning electron micrograph of (a) and (b) polypyrrole, (c) and (d) polyEDOT and (e) and (f) co-deposited polypyrrole/polyEDOT.

Shown in FIG. 7 is the SEM of pPy chemical polymerised onto a fabric (wool). This shows globular/powdery morphology of the pyrrole on the fabric surface. This is undesirable for a stable cathode. Shown in FIG. 8 is the SEM of the smooth morphology of the copolymer (PPY-pEDOT) grown on a silver coated knit fabric. The concept of the co-polymerisation is illustrated perfectly. Further SEM images of pPy, pEDOT and co-deposited pPy/pEDOT are shown in FIG. 20. The polymers were deposited by electrochemical oxidation of monomer and mixed monomer solutions (0.31 V vs Ag/Ag+, 1-2 C/cm2 of charge). Parts (a) and (b) are of pPy, (c) and (d) are of pEDOT, and (e) and (f) are of co-deposited pPy and pEDOT The SEM figures show that the co-deposited product is more open and porous.

Example 3

Polymerisation/Deposition Techniques

In this example, various techniques for depositing, polymerising and oxidising the conductive polymers were tested. Good results were obtained with ionic liquids as the solvent for the monomers from which the polymers were deposited onto the fabric substrates.

In this example, the techniques utilised to deposit the single polymers onto fabric substrates which were used to format the comparison products used in the preceding comparison examples, are also shown.

Deposition of pEDOT Onto Wool or Cotton Fabrics in Aqueous or Organic Media

A stock block co-polymer (Poly(propylene glycol)-block-poly(ethylene glycol)-block-poly(propylene glycol)/ethanol solution is used to dilute EDOT monomer concentrate. The stock block copolymer/ethanol solution is made by measuring 16.9 gm of block co-polymer and diluting up to 100 ml with AR grade 95% ethanol in a volumetric flask. In a second step 1 ml of EDOT monomer is diluted to 10 ml with the pre-prepared stock block co-polymer/ethanol solution to form the "diluted EDOT solution". The block co-polymer acts as a dispersant for the EDOT mixture.

A half strength oxidant solution (Baytron CB40 diluted with AR grade 95% ethanol in a 1:1 ratio) is also prepared. Baytron C-B40 is a chemical product containing Ferric tosylate in Butanol, produced by Bayer—South East Asia Pty Ltd.

For cotton fabric use 0.5 gm of fabric and add a pre-mixed solution of 1.25 ml of half strength Baytron to 1.25 ml of diluted EDOT solution, and pour immediately onto the fabric contained within a plastic bag, massaging well. A ratio of approx. 2.5 ml of diluted (1:1) Baytron mix is used for soaking every 1 gm of cotton fabric.

For wool fabrics a greater reaction volume is required, as the wool fabric soaks up more solution.

For each 0.5 gm wool, 2.5 ml of half strength oxidant is added to 2.5 ml of diluted EDOT solution, mixed well and applied immediately to the fabric in a plastic bag, massaging well for 3-4 minutes.

All fabric samples are then removed from their bags and allowed to partially polymerise at room temperature, exposed to the air, for 30 minutes.

All samples are then placed back into bags and a further 1.25 ml of full strength Baytron C-B40 is added to the centre of the cotton fabric, with 2.5 ml of full strength Baytron C-B40 being added to the wool fabrics. Fabrics are massaged well, to evenly spread the oxidant over the fabric surface. The fabrics are then removed from the bags and once again allowed to partially polymerise in the air.

The fabrics sit for a further 2 hours at room temperature, and gradually develop a dark blue colour before being placed onto a heated glass plate. The glass plate is around 52-53° C. initially, rising to 61-63° C. at the end of a 40 minutes treatment. Fabric temperatures range from around 36° C. initially, to a maximum of around 53° C. by the end of the treatment time.

Samples are heated for 40 minutes before removal from the heated glass, and then after cooling, are given a 15 minute rinse in 'drum' ethanol, followed by a 5 minute fresh rinse in AR grade ethanol. Samples are dried overnight in the fume cupboard, and measured on a resistance rig, using a 1 cm separation.

Total chemical development time (from the time monomers are first mixed with oxidant) is approximately 3 hrs 10 minutes.

Deposition of Polypyrrole Onto Wool or Cotton Fabrics

The chemical deposition method for polypyrrole onto fabrics, is carried out by first collecting and weighing all samples, and then placing them in 'Reverse Osmosis' (RO) water with a few drops of Lissapol TN450 (which act as a wetting agent) to pre-wet the samples over a period of 30 minutes. The samples are then rinsed and drained on a paper towel, so that they are ready to be treated in a high sided chemical deposition dish (dish of appropriate capacity to prevent spillage). Liquor volume to sample weight ratio is kept preferentially at 60:1. The solutions for the polymerisation step are prepared in pre-determined ratios to make a total reaction volume as required by the ratio 60:1. (Use Molar ratios $FeCl_3.6H_2O$/pyrrole=2.22, AQSA/pyrrole=0.40).

Anthraquinone-2-sulfonic acid sodium salt monohydrate 97% (AQSA) is partially dissolved/suspended in water and the required weight of ferric chloride hexahydrate ($FeCl_3.6H_2O$) is dissolved in RO water, then added to the AQSA suspension and allowed to mix well for several minutes until all the AQSA suspension has fully dissolved.

The high sided reaction dish has a volume capacity to prevent any likelihood of spillage during the rocking motion which is required for the most even polymerisation treatment.

The drained fabric samples are placed into the petri dish and the AQSA/FeCl3 (oxidant/dopant) solution is added to the dish to allow a complete soaking of the fabrics with the reaction mix over a period of thirty minutes.

The chosen dish is placed onto a gently rocking platform, in a fume cupboard.

A solution of pyrrole in RO water (determined from the prescribed molar ratios above) has previously been prepared with the addition of one to several mls of ~7% HCL solution, which aids the dissolution of the pyrrole. This pyrrole solution is then added drop-wise to the reaction mixture containing the soaked fabrics over a period of several minutes.

The samples/mixture are left to rock gently in the fume cupboard out of direct light, at room temperature for a total of 4 hours.

The samples are then rinsed with two ethanol rinses and then rinsed thoroughly again under running tap water, until no more obvious black particulate matter is seen to be coming off the surface.

Samples are dried on a rack in the fume cupboard overnight.

Figure 9:
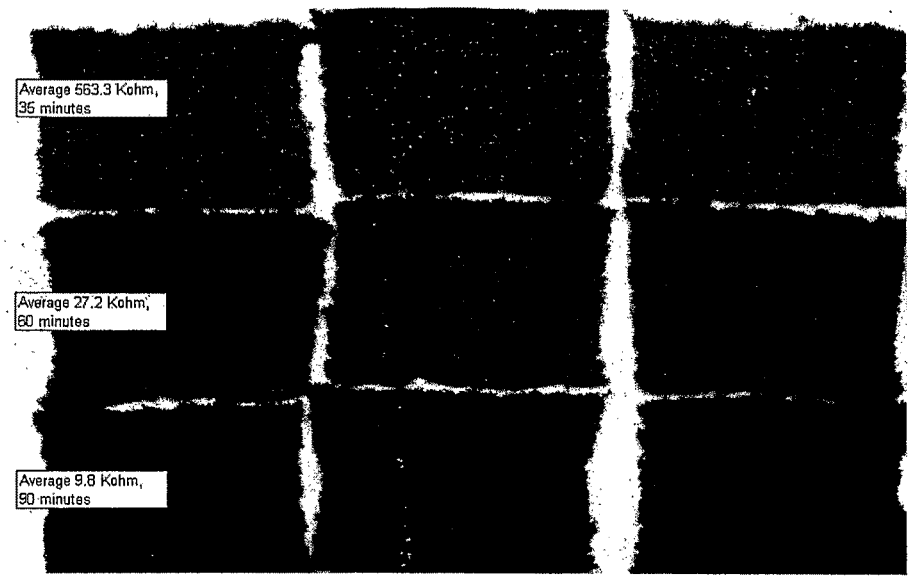
FIG. 9 contains optical images showing the effect of time using chemical methods to deposit polypyrrole onto a wool-based fabric. As the layer thickness increases, the fabric becomes darker and the resistivity of the fabric decreases.

FIG. 9 shows optical images of pPy treated samples using the same chemical deposition technique, but here the chemical ratios have been deliberately altered in order to achieve a higher Resistivity outcome, whilst still maintaining uniform coverage. All samples were treated in triplicate to show the reproducibility of these experiments. In the top left-hand corner of the image, the electrical resistivity of the fabrics is displayed, showing this decreasing with time as the conducting polymer continues to deposit from solution. Our experiments show that four (4) hours is the optimum treatment time for a uniform coverage outcome.

The coated fabrics are then immersed in a distilled water solution containing an excess of lithium bis(trifluoromethansulfonyl)imide (LiTFSI) in order to remove any residual chloride (from the oxidant) and AQSA dopant. It has been found to be beneficial to ensure that the dopant ion is the same as that used in the electrolyte for the battery as this ensures that the anode, such as a lithium electrode, is not corrupted by ions that are not stable at deeply negative potentials and that the fabric can be "wetted" by the electrolyte to ensure a low interfacial resistance.

Figure 12:
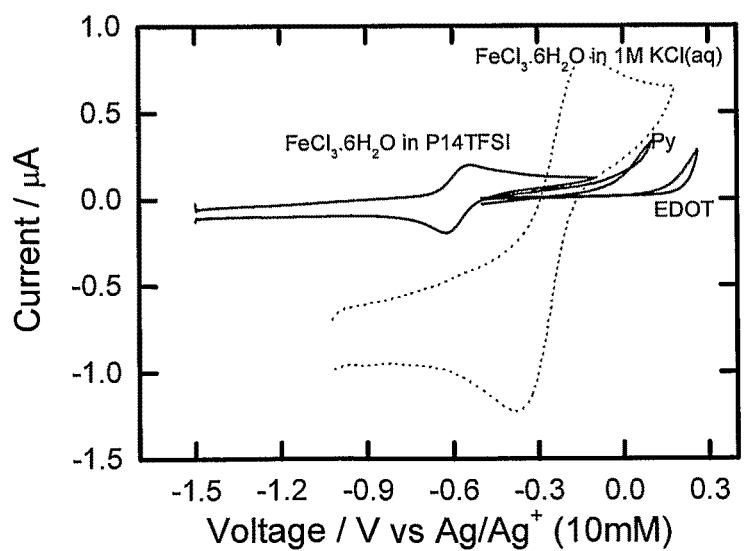
FIG. 12 is a cyclic voltamogram showing the oxidation and reduction potentials of $FeCl_3 \cdot 6H_2O$ in the ionic liquid $P_{14}TFSI$ (the solid line) and 1M KCl aqueous solution (the dotted line). Also shown are the oxidation potentials required for oxidising pyrrole and EDOT (marked Py and EDOT, respectively)

Ionic Liquids:

The type of oxidant chosen is important to having the appropriate potential to cause the monomer to oxidise and become a polymer. Commonly used oxidants include $FeCl_3$, $FeCl_3.6H_2O$, $Fe(ClO_4)_3$ hydrate, Fe tosylate.$6H_2O$, $AgNO_3$, $AgCl_3$, (for example see J. Pringle et al. Synthetic Metals 156, 2006, 979.). The use of a dopant ion is also found to be important in those techniques utilising aqueous or aprotic solvents. As noted in the procedure above, AQSA is added to balance the charge on the monomer back-bone. Using electrochemical experiments as shown in FIG. 12, the reversible oxidation/reduction potential of $FeCl_3.6H_2O$ is −580 mV vs Ag/Ag$^+$ (10 mM) and is ~600 mV lower than the potential to oxidise pyrrole (~0.0V vs Ag/Ag$^+$ (10 mM)) and ~800 mV lower in the case of EDOT (~0.2V vs Ag/Ag$^+$ (10 mM). We believe all the Fe-based compounds listed above would have similar oxidation/reduction potentials in ionic liquids, therefore demonstrating $Fe^{3+}$ is not a strong enough oxidant to cause these monomers to polymerise and hence another polymerisation mechanism must be at work.

We have added pyrrole and EDOT monomers to solutions of ionic liquid (reaction media) and $FeCl_3.6H_2O$ (oxidant) without adding any extra dopant media for separately adding the counterion. The polymerisation reaction does occur in ionic liquids and a polymer is formed. We note several important aspects, not previously noted, to the polymerisations described in detail below:

The use of a small amount of oxidant, rather than equimolar as used in the aqueous case—15 mM of $FeCl_3.6H_2O$ to 0.2M of pyrrole. This is due to the 6 water molecules to every 1 $FeCl_3$ molecule;

The polymerisation reaction occurs even though the apparent oxidation potential of the $FeCl_3.6H_2O$ oxidant is much lower than that needed to cause the monomer to react;

The role of Fe and Cl, or any other inorganic "oxidant" is to act as a counter-ion in the oxidised polymer. Where hydrated inorganic oxidants are used, it is the hydrate which forms an acid in the ionic liquid solution which in turn drives the polymerisation of the monomer. Consequently metal ions are not required in solution;

Acids such as HTFSI, HFSI, $HNO_3$, HCl, $H_2SO_4$ are sources of protons as they are super acids in the ionic liquid medium and cause polymerisation of the monomer(s);

The use of acids requires equimolar amounts of monomer and acid, i.e. 1 proton to 1 monomer;

The reaction solution of Ionic Liquid can be recycled for future use unlike reactions conducted in aprotic or aqueous media;

Presence or absence of oxygen ($O_2$ is a possible oxidant) does not affect the reaction noticeably, as the polymerisations have been achieved both on the bench and in a controlled Argon atmosphere glove box; and The use of a distillable ionic liquid, such as DIMCARB, could be used to produce polymer and then be evaporated then reformed for re-use. This allows ink-jet printing of these conducting polymers onto fabric substrates.

Chemical Growth of pPy in ionic liquid solution pPy: To 5 mls of 1-butyl-methylpyrrolidinium bis(trifluoromethansulfonyl)imidide or bis(trifluoromethansulfonyl)imide ($P_{14}$TFSI) 11 mg of $FeCl_3.6H_2O$ was added, to act as an oxidant, with stirring. On dissolution, the solution was pale yellow in colour. To this, 6 drops or approximately 90 mg of distilled pyrrole was added to the solution. A black layer slowly forms at the top of the solution indicating the oxidation of pyrrole to poly(pyrrole), the reaction appearing to be diffusion limiting (as indicated by the slow progression of the black layer down into solution). On agitation or mixing of the solution, the unreacted pyrrole begins to oxidise and the solution as a whole becomes black with particulate matter forming indicating the reaction consumes all the pyrrole. At the end of the reaction, a black material can be seen as a colloidal suspension within the ionic liquid.

Generic Acid Oxidation of Pyrrole Monomer in Ionic Liquid: To 6 mls of 1-butyl-methylpyrrolidinium bis(trifluoromethansulfonyl)imidide or bis(trifluoromethansulfonyl)imide ($P_{14}$TFSI, Merck synthesis grade, used as received) 17-168 mg of HTFSI acid was added, to act as an oxidant, with stirring to prepare stock reaction solution. 1 ml of this solution was then removed to which 0.64-6.4 µL of distilled pyrrole was added with stirring. A black layer forms in solution indicating the oxidation of pyrrole to poly(pyrrole) with particulate matter forming indicating the reaction consumes all the pyrrole. At the end of the reaction, a black material can be seen as a colloidal suspension within the ionic liquid. This reaction was conducted on the laboratory bench.

pEDOT: To 5 mls of 1-butyl-methylpyrrolidinium bis(trifluoromethansulfonyl)imidide or bis(trifluoromethansulfonyl)imide ($P_{14}$TFSI, Merck, synthesis grade, used as received) 11 mg of $FeCl_3.6H_2O$ (Fluka, used as received) was added, to act as an oxidant, with stirring. On dissolution, the solution becomes pale yellow in colour. To this solution, 6 drops or approximately 108 mgs of EDOT (Aldrich, used as received) was added to the solution. A royal blue colour starts to form at the top of the solution and can be observed diffusing into the bulk solution slowly. With agitation or mixing of the solution, the unreacted EDOT immediately oxidises in solution turning the whole solution a royal blue colour indicating that the reaction has proceeded using up all the monomer. At the end of the reaction, which proceeds much faster than the pyrrole reaction, the solution is royal blue in colour with particulate material present as a colloidal suspension.

Generic Acid Oxidation of EDOT Monomer in Ionic Liquid: To 6 mls of 1-butyl-methylpyrrolidinium bis(trifluoromethansulfonyl)imidide or bis(trifluoromethansulfonyl)imide ($P_{14}$TFSI, Merck synthesis grade, used as received) 17-168 mg of HTFSI acid was added, to act as an oxidant, to prepare a stock reaction solution. 1 ml of this solution was taken to which 1.1-10.7 µL of distilled EDOT was added with stirring. A black/blue layer forms in solution indicating the oxidation of EDOT to poly(EDOT) with particulate matter forming indicating the reaction consumes all the EDOT. At the end of the reaction, a black/blue material can be seen as a colloidal suspension within the ionic liquid. This reaction was conducted on the laboratory bench.

Co-polymerisation of EDOT and Py and Chemical Oxidation in Ionic Liquids: To 1 ml of 1-butyl-methylpyrrolidinium bis(trifluoromethansulfonyl)imidide or bis (trifluoromethansulfonyl) imide ($P_{14}$TFSI, Merck, synthesis grade, used as received) 14 mg of $FeCl_3.6H_2O$ (Fluka, used as received) was added, to act as an oxidant, with stirring. On dissolution, the solution becomes pale yellow in colour. To a second vial of 1 ml $P_{14}$TFSI, 57 mgs of EDOT and 17 mgs of pyrrole was added and then stirred to ensure it was homogeneously dispersed. Using a pipette, the solution of $FeCl_3.6H_2O$ in $P_{14}$TFSI was slowly added to the vial containing the monomers. The solution turns from clear to pale yellow (effect of the ferric chloride) with a blue/green colour showing the oxidation of the monomers to polymers. The reaction continues as more of the oxidant solution is added. The polymers continue to grow and at the end of the reaction, a colloidal suspension of particles can be observed in a brown solution. Using this methodology we can control the rate of polymerisation helping with the polymer adhesion to fabric substrates.

Figure 18:
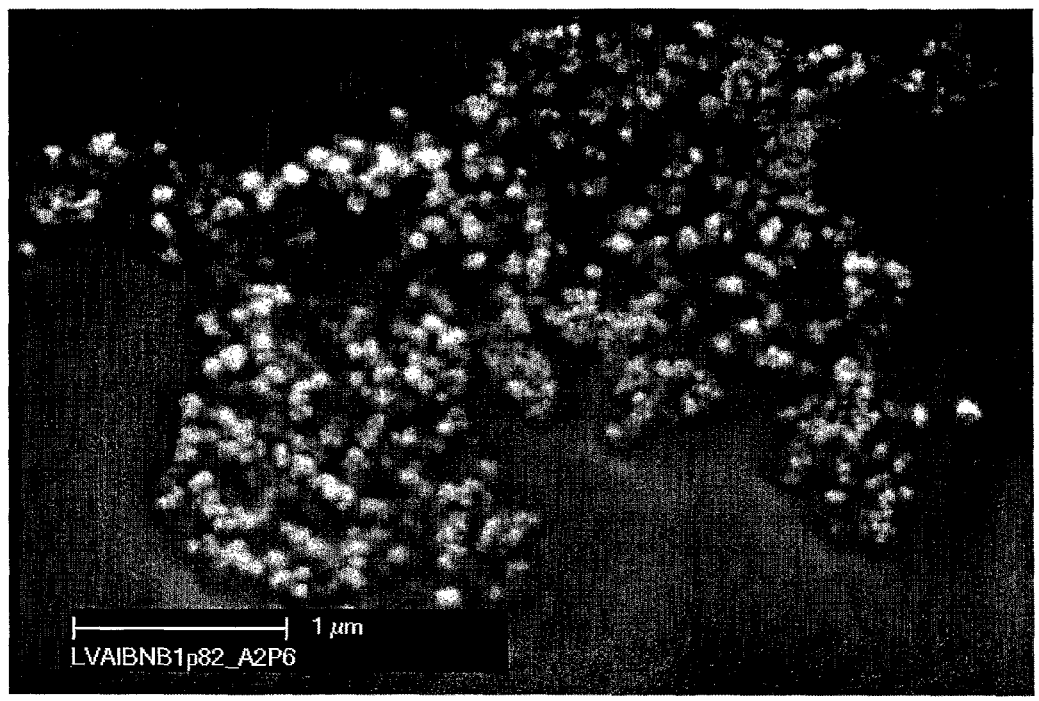
FIG. 18 is a scanning electron micrograph (SEM) of a suspension of polypyrrole particles with silver nanoparticles.
Figure 19:
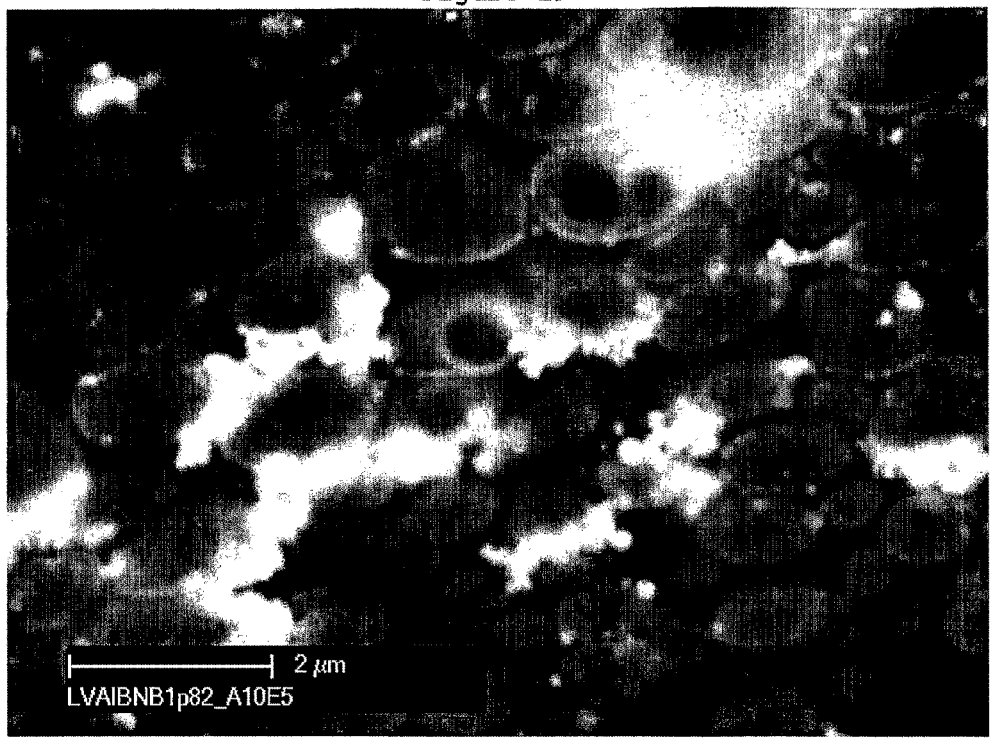
FIG. 19 is a scanning electron micrograph of a suspension of PolyEDOT with Ag nanoparticles within the matrix.

$AgNO_3$ Oxidation of Monomers in DIMCARB:

DIMCARB (dimethylammonium dimethyl carbamate) was prepared according to the method of Anand I. Bhatt, Adam Mechler, Lisandra Martin, Alan M. Bond, *Journal of Materials Chemistry*, 2007, vol 17, pages: 2241-2250. To 6 mls of the DIMCARB (used as prepared) 2-10.2 mg of $AgNO_3$ (Aldrich, used as received) was added, to act as an oxidant, and the mixture was sonicated for 2 mins-1 hr or until all solid has dissolved to prepare a stock reaction solution. 1 ml of this solution was taken to which 0.1-0.4 mL of distilled pyrrole (Aldrich) was added with stirring. A black/blue layer forms slowly in solution indicating the oxidation of pyrrole to poly(pyrrole) with particulate matter forming over a period of 12 hours indicating the reaction consumes all the pyrrole monomer. At the end of the reaction, a black/blue material can be observed as a colloidal suspension within the ionic liquid. It should also be noted that this suspension will contain Ag nano-particles as shown in FIG. 18. In FIG. 18, the Ag nano-particles appear white. This reaction was conducted on the laboratory bench. As similar reaction was conducted for EDOT, where 0.1-0.5 mL of EDOT was added to 1 mL of the DIMCARB stock solution. The polymerisation occurred over 12 hour period with Ag nano-particles within the p(EDOT) matrix as shown in FIG. 19. Again, the Ag particles appear white.

HTFSI Oxidation of Monomers in DIMCARB:

To 3 mls of Dimethylcarbamate (DIMCARB, prepared as above) 8.2-86 mg of HTFSI (Aldrich, used as received) was added, to act as an oxidant, and stirred until all the solid had dissolved to prepare a stock reaction solution. 1 ml of this solution was taken to which 1.1-10.7 µL of distilled EDOT (Aldrich) was added with stirring. A black/blue layer forms slowly in solution indicating the oxidation of EDOT to poly (EDOT) with particulate matter forming over a period of 12 hours indicating the reaction consumes all the EDOT. At the end of the reaction, a black/blue material can be observed as a colloidal suspension within the ionic liquid.

Use of Fabrics: This method allows for any fabric, yarn, fibre or filament, treated or otherwise to be coated with a conducting polymer. To 2.5 gms of 1-butyl-methylpyrrolidinium bis(trifluoromethansulfonyl)imidide or bis(trifluoromethansulfonyl)imide ($P_{14}$TFSI, Merck, synthesis grade, used as received) 21 mg of $FeCl_3.6H_2O$ (Fluka, used as received) was added, to act as an oxidant, with stirring. On dissolution, the solution becomes pale yellow in colour. To a second vial of 2.5 gms of $P_{14}$TFSI, 57 mgs of pyrrole was added and then stirred to ensure it was homogeneously dispersed. On a plastic petri-dish, 4 pieces of chlorine hercosett treated wool was used to absorb the monomer solution. With a pipette, the solution of $FeCl_3.6H_2O$ in $P_{14}$TFSI was slowly added across the fabrics which had been soaked with the monomer solution. The solution turns from clear to pale yellow (effect of the ferric chloride) with a blue/green colour showing the oxidation of the monomers to polymers. The reaction continues as more of the oxidant solution is added. The polymers continue to grow over a four hour period and at the end of the reaction, a colloidal suspension of particles can be observed in a brown solution.

The fabrics having the polymers co-deposited thereon can be subjected to ion exchange when the oxidant counterion (eg $Cl^-$ in the case of $FeCl_3$) is not the same as the anion of the ionic liquid to be used as the electrolyte in the energy storage device.

Example 4

Layering Methods

A layering experiment has been performed using 2 approaches. The first approach was to prepare 4 identical wool knit fabrics (approximately 4×4 cm) for an initial pPy coating as described in example 3. The second approach was to take a further 4 identical fabrics of the same dimensions for an initial pEDOT coating using the same method in example 3.

After the first layer coating of each experiment, one sample was kept aside, and the remaining samples were then treated with the alternative coating (i.e. either pEDOT or pPy respectively). After this series was completed, one of each type of these treated fabrics was kept aside and the remaining samples were given a further alternative layer treatment. The experiment was continued in this manner until there were examples of 1, 2, 3 and 4 layered samples for each of the series i.e. alternative layered conducting polymer samples for one series starting with pPy, and another series starting with pEDOT as the initial layer.

Figure 10:
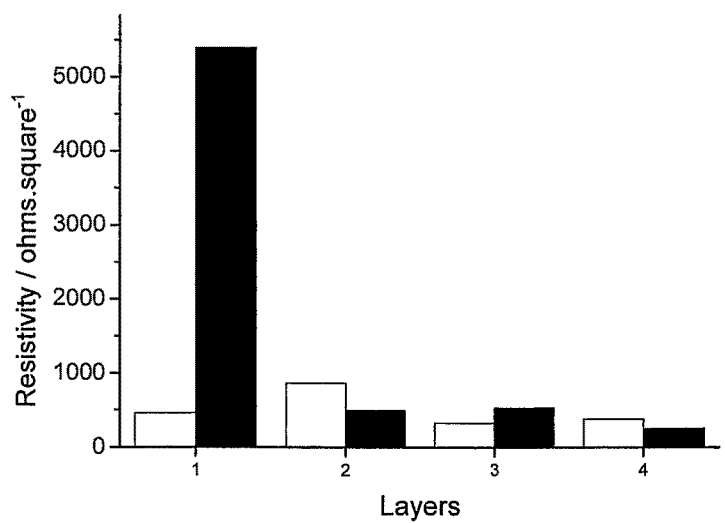
FIG. 10 is a graph of resistivity values obtained for the multi layered alternating conducting polymer series of wool knit samples. Black bars show the base layer being pEDOT and clear bar being the pPy base layer.
Figure 11:
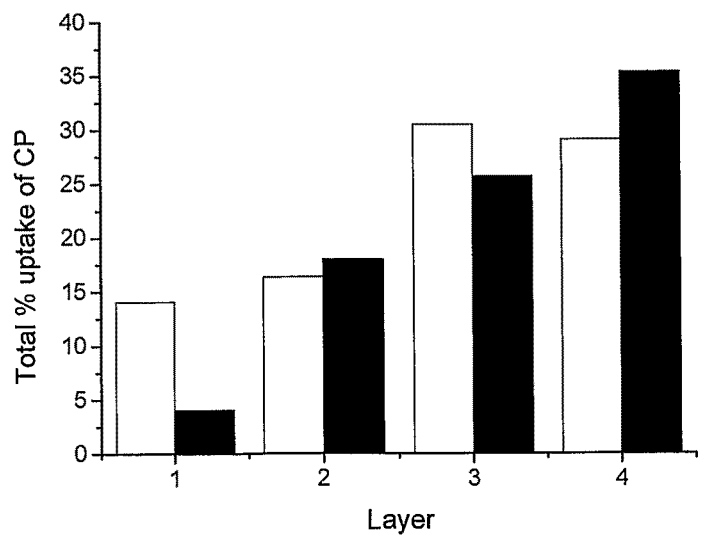
FIG. 11 is a graph of the effect on the loading percentage (mass increase of conducting polymer over the original mass of fabric) of the conducting polymer using a layering technique. Black bars show the base layer being pEDOT and the clear bar being the pPy base layer.

FIG. 10 shows the resistivity of the wool treated fabric as each conducting polymer layer is added. The resistivity value decreases for each of these samples as the total weight % of conducting polymer (CP) uptake has increased. The pPy uptake appears to be further enhanced when following on from a previous pEDOT layer. However, the pEDOT layers have always been much reduced in each total weight % uptake compared to the pPy uptakes, and immediately after each pEDOT layer has been deposited there has been a slight increase in the resistivity. (See pPy series, layer 2 and 4; pEDOT series layer 3). The % weight uptake results shown in FIG. 11 are estimations only, due to some inevitable fabric losses from the wool knits during the polymerisation treatments and washing procedures.

The most important outcome from these results is that a preceeding pEDOT layer is able to enhance the uptake of the next pPy layer, whereas a preceeding pPy layer does not appear to actively improve the uptake of the next pEDOT layer. Applying 4 alternate layers of CP, beginning with a pEDOT layer has enabled approximately 35% total increase in weight of conductive material to be added on to the fabric surface. The most conductive fabric will have a final exposed layer of pPy.

The fabrics are ion-exchanged using the same methodology as described in Example 3 before the construction of batteries for testing.

Example 5

Co-monomers for Producing Conductive Polymers for Flexible Cathode Applications

The co-monomers illustrated below are examples of co-monomers based on pyrrole and thiophene units (including 3,4-ethylenedioxythiophene). The functionality of eg thiophene and the pyrrole are incorporated at a molecular level, rather than a layered mixture of the polymers (chemical depositions) or what is essentially a block co-polymer mixture (co-deposition) by covalently bonding units of the thiophene to pyrrole in a variety of combinations (such as the examples shown below). This results in a simple one-step deposition of the two functionalities with the aim to get the best combination of properties of the two separate polymers. These co-monomers can be converted into conductive polymers using any of the techniques described above. Accordingly, these co-monomers can be polymerised in aqueous, organic or ionic liquid solution systems. Polymers produced from these co-monomers also exhibit the enhanced capacitance and low resistance.

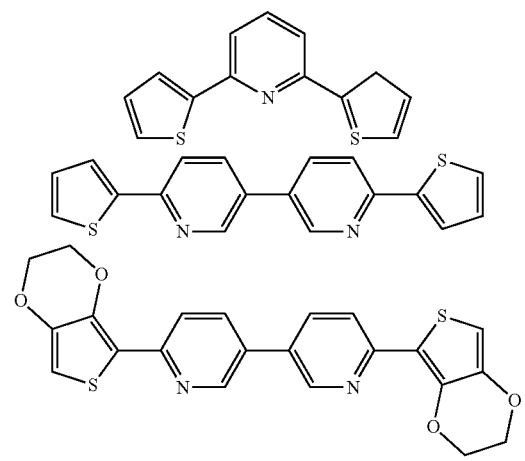

Figure 13:
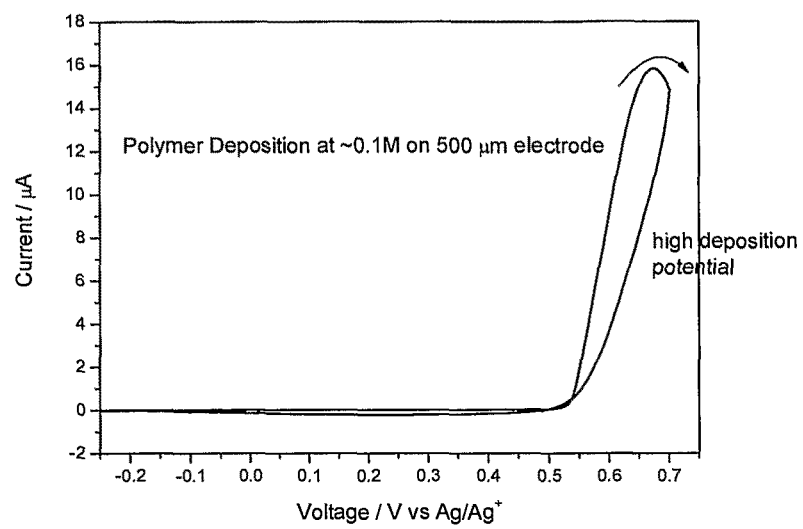
FIG. 13 is a cyclic voltammogram for the polymerisation/electrodeposition on 500 μm platinum electrode of ~0.1M thiophene-pyrrole-thiophene co-monomer in 1-methyl-propylpyrrolidinium bis(flourosulfonyl)imide run at $20 \text{ mV} \cdot s^{-1}$.
Figure 14:
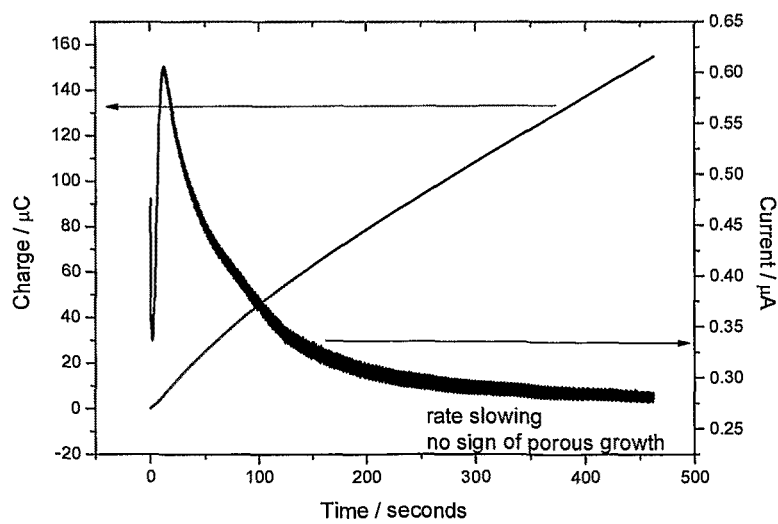
FIG. 14 shows constant voltage deposition at 0.6V (vs. Ag|AgOTf reference electrode) of ~0.1M thiophene-pyrrole-thiophene co-monomer in 1-methyl-propylpyrrolidinium bis (fluorosulfonyl)imide showing charge passed (in micro-Coulombs) and current (micro-Amperes).
Figure 15:
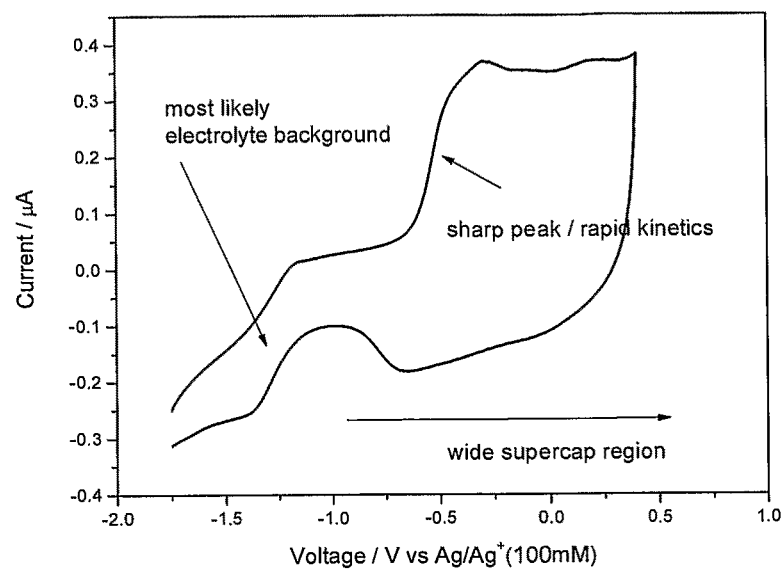
FIG. 15 is a cyclic voltammogram for an electro-deposited 1.9 $C \cdot cm^{-2}$ of thiophene-pyrrole-thiophene polymer on a 100 µm platinum electrode grown in 1-methyl-propylpyrrolidinium bis(fluorosulfonyl)imide in Acetonitrile 1M tetraethylammonium tetrafluoroborate ($N(C_2H_5)_4 BF_4$).

FIG. 13 shows the cyclic voltammetric deposition of the co-monomer (thiophene-pyrrole-thiophene) using a ~0.1 M solution in 1-methyl-propylpyrrolidinium bis(fluorosulfonyl)imide at a 500 μm platinum electrode. A deposition potential of around 0.6 V vs Ag/AgOTf is required for deposition. FIG. 14 is constant voltage deposition at this voltage of 0.6V (vs. Ag/AgOTf reference electrode) of ~0.1M thiophene-pyrrole-thiophene co-monomer in 1-methyl-propylpyrrolidinium bis(flourosulfonyl)imide showing charge passed (in micro-Coulombs) and current (micro-Amperes). The current (rate of reaction) increases to a peak initially but decreases further with time, indicating dense growth of the polymer. This behaviour is undesireable for a high rate material and suggests an organic solvent may be a better medium to deposit from. A 1.9 $C·cm^{-2}$ layer of the polymer on a 100 µm platinum electrode grown in 1-methyl-propylpyrrolidinium bis(fluorosulfonyl)imide layer is transferred to an acetonitrile 1M tetraethylammonium tetrafluoroborate ($N(C_2H_5)_4 BF_4$) solution and the cyclic voltammetry carried out. This structure is thought to open out in acetonitrile and gives good kinetics for the charging and discharging according to the cyclic voltammetry (sharp peaks and wide square capacitive region).

Various modifications may be made to the embodiments described and exemplified above without departing from the spirit and scope of the invention.

The invention claimed is:

1. A flexible electrode comprising:
   a fabric substrate;
   a first conductive polymer selected from the group consisting of polypvrroles, polyamilines, polyphenyl mercaptans, polycarbazoles, polyindoles, polyfurans, polyoxyphenazines, polypyridines, polypyrimidines, polyquinolines, polybenzimidazoles and polyanthraquinones;
   a second conductive polymer which is different to the first conductive polymer and is selected from the polythiophene class; and
   a counterion stable to lithium,
   wherein either:
   (a) the first conductive polymer and the second conductive polymer are in the form of a mixture of conductive polymers on the fabric substrate,
   (b) the first conductive polymer and second conductive polymer are present as separate layers on the fabric substrate, or
   (c) the first conductive polymer and the second conductive polymer ace in the form of a copolymer on the fabric substrate.

2. The flexible electrode of claim 1, wherein the first conductive polymer is of the polypyrrole class.

3. The flexible electrode of claim 1, wherein the fabric substrate comprises an electron-conductive material.

4. The flexible electrode of claim 3, wherein the fabric substrate comprises threads of electron-conductive material spaced across the fabric.

5. The flexible electrode of claim 1, further comprising conductive metal particles.

6. The flexible electrode of claim 1, wherein the counterion stable to lithium is selected from (i) a sulfonyl imides, including the bis imides and perfluorinated versions thereof, (ii) $BF_4^-$ and perfluorinated alkyl fluorides of boron, (iii) halides, alkyl halides or perhalogenated alkyl halides of group VA(15) elements, and (iv) chlorate and perchlorate anions.

7. A flexible energy storage device comprising the flexible electrode of claim 1 and an electrolyte in a flexible housing.

8. The flexible energy storage device of claim 7, wherein the electrolyte comprises an ionic liquid.

9. The flexible energy storage device of claim 7, comprising lithium mobile ions.

10. The flexible energy storage device of claim 8, comprising lithium mobile ions.

* * * * *

UNITED STATES PATENT AND TRADEMARK OFFICE
CERTIFICATE OF CORRECTION

PATENT NO. : 8,617,736 B2  
APPLICATION NO. : 12/988352  
DATED : December 31, 2013  
INVENTOR(S) : Bhatt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 312 days.

Signed and Sealed this  
Twenty-second Day of September, 2015

Michelle K. Lee  
*Director of the United States Patent and Trademark Office*